(12) United States Patent
Odorisio et al.

(10) Patent No.: US 8,436,131 B2
(45) Date of Patent: May 7, 2013

(54) SOLID STATE POLYMERIZATION PROCESS FOR POLYESTER WITH PHOSPHINIC ACID COMPOUNDS

(75) Inventors: Paul Odorisio, Leonia, NJ (US); Stephen M. Andrews, New Fairfield, CT (US); Thomas F. Thompson, Highland Mills, NY (US); Si Wu, Ossining, NY (US); Paragkumar Thanki, Maharashtra (IN); Deepak M. Rane, Maharashtra (IN); Delina Joseph, Maharashtra (IN); Jianzhao Wang, Yorktown Heights, NY (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/568,585

(22) Filed: Aug. 7, 2012

(65) Prior Publication Data

US 2013/0035451 A1    Feb. 7, 2013

Related U.S. Application Data

(63) Continuation of application No. 13/214,751, filed on Aug. 22, 2011, now Pat. No. 8,258,253, which is a continuation of application No. 12/384,029, filed on Mar. 31, 2009, now Pat. No. 8,030,435.

(60) Provisional application No. 61/072,909, filed on Apr. 3, 2008.

(51) Int. Cl.
*C08G 64/00*   (2006.01)
*C08G 63/02*   (2006.01)

(52) U.S. Cl.
USPC ........... 528/272; 502/150; 502/208; 528/271; 528/275; 528/279; 528/287

(58) Field of Classification Search .................. 502/150, 502/208; 528/271, 272, 275, 279, 287
See application file for complete search history.

(56) References Cited

U.S. PATENT DOCUMENTS

| | | | |
|---|---|---|---|
| 4,161,473 A | 7/1979 | Spivack et al. | |
| 5,453,479 A | 9/1995 | Borman et al. | |
| 5,807,932 A | 9/1998 | Pfaendner et al. | |
| 5,981,690 A | 11/1999 | Lustig et al. | |
| 7,205,379 B2 | 4/2007 | Simon et al. | |
| 2005/0239929 A1 | 10/2005 | Sakamoto et al. | |
| 2006/0020103 A1 | 1/2006 | Tsukamoto et al. | |
| 2008/0108779 A1 | 5/2008 | Andrews et al. | |
| 2009/0005531 A1 | 1/2009 | Thomspon et al. | |
| 2009/0082529 A1 | 3/2009 | Kageyama et al. | |
| 2009/0143561 A1 | 6/2009 | Andrews et al. | |
| 2009/0297752 A1 | 12/2009 | Togawa et al. | |

FOREIGN PATENT DOCUMENTS

| | | |
|---|---|---|
| GB | 1338091 | 11/1973 |
| JP | 2002249566 | 9/2002 |
| JP | 2002293909 | 10/2002 |
| KR | 20060076826 | 7/2006 |

OTHER PUBLICATIONS

English Language Abstract of JP2002293909 from Esp@cenet website printed on Jul. 8, 2009.
All references are of record in parent application U.S. Appl. No. 12/384,029, filed Mar. 31, 2009.

*Primary Examiner* — Terressa Boykin
(74) *Attorney, Agent, or Firm* — Tyler A. Stevenson

(57) ABSTRACT

Disclosed are phosphinic acid compounds of formula I, II or III

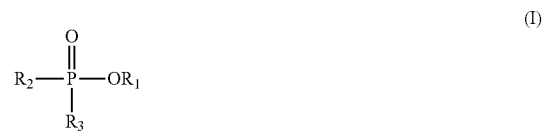

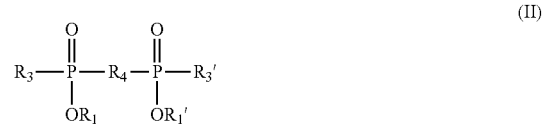

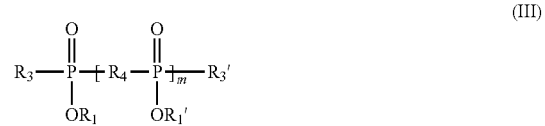

where $R_1$ and $R_1'$ are for instance straight or branched $C_1$-$C_{50}$alkyl, $R_2$ is for instance straight or branched $C_{22}$-$C_{50}$alkyl, $R_3$ and $R_3'$ are for instance straight or branched $C_1$-$C_{50}$alkyl, $R_4$ is for instance straight or branched $C_1$-$C_{50}$alkylene and m is from 2 t 100. Also disclosed are polyester compositions comprising the compounds of formula I, II and III.

13 Claims, No Drawings

SOLID STATE POLYMERIZATION PROCESS FOR POLYESTER WITH PHOSPHINIC ACID COMPOUNDS

This application is a continuation of U.S. application Ser. No. 13/214,751, filed Aug. 22, 2011, now U.S. Pat. No. 8,258,253, which is a continuation of U.S. application Ser. No. 12/384,029, filed Mar. 31, 2009, now U.S. Pat. No. 8,030,435, which claims benefit of U.S. provisional app. No. 61/072,909, filed Apr. 3, 2008, the contents of which are incorporated by reference.

The invention relates to a method for the solid state polymerization (SSP) of polyesters, in particular polyethylene terephthalate, which method comprises employing certain phosphinic acid compounds in the preparation of the polyesters.

BACKGROUND

Polyesters, such as polyethylene terephthalate (PET) are prepared industrially in a two stage process. The first stage in PET preparation involves the direct esterification of terephthalic acid with ethylene glycol, or alternatively transesterification of a $C_1$-$C_4$ dialkylterephthalate with ethylene glycol to form a low molecular weight precondensate. In a second stage, the precondensate is polycondensed to form high molecular weight polyethylene terephthalate. Both stages typically employ catalytic acceleration.

Depending on the end use of the polyester, a further solid state polymerization step (SSP) is employed to arrive at the desired viscosity or molecular weight build up. The polyesters according to this invention are subjected to solid state polymerization.

Numerous compounds have been proposed as esterification, transesterification or polycondensation catalysts. Choice of catalyst effects the color, strength and processing properties of the end product. Choice of catalyst effects for example the amount of aldehyde generation. Choice of catalyst also controls selectivity of the reaction and effects the amount of impurities formed such as diethylene glycol, cyclic oligomers and carboxylic acid end groups.

Choice of catalyst also effects the time required to achieve a desired viscosity or molecular weight build up in the solid state polymerization step. For instance, titanate catalyzed polyesters are known to exhibit relatively slow SSP rates as compared to for example antimony catalyzed polyesters. Nonetheless, titanate catalysts are valued by the polyester industry since they can provide for fast polycondensation rates at low levels. The value of certain catalysts in the industry would be enhanced if their shortcomings could be overcome.

JP2002293909 is aimed at a method for producing polyester.

U.S. Pat. No. 7,205,379 discloses a process for the preparation of a stabilized polyester that is low in the generation of aldehydes.

U.S. Pat. No. 5,981,690 teaches poly(alkylene arylates) which are prepared using an organic titanate-ligand catalyst solution containing organic silicates and/or zirconates and, preferably, certain phosphorus compounds.

U.S. Pat. No. 5,453,479 is aimed at novel polyesterification catalysts comprising a phosphorus component and a titanium component which are useful in preparing improved blends of polyester and polycarbonate resins.

GB 1338091 is aimed at the production of highly polymeric polyesters of aromatic dicarboxylic acids and dihydric alcohols.

U.S. published app. No. 200510239929 teaches a polyester that can be produced substantially without using an antimony compound as a polycondensation catalyst.

It has now been found that where certain metal catalysts are employed in the esterification or transesterification or polycondensation steps of preparing a polyester, that the presence of certain phosphinate compounds provides for higher molecular weight build up, or viscosity increase, during a subsequent SSP step. That is, the SSP rate is increased. The high viscosity polyester obtained also has high brightness and low yellow color and exhibits little aldehyde formation on melt processing.

SUMMARY

Disclosed is a method for the preparation of a polyester, which method comprises in a first step, reacting a dicarboxylic acid or a $C_1$-$C_4$ dicarboxylic diester with a diol at a suitable temperature and pressure to effect esterification or transesterification to prepare a precondensate and in a second step, reacting the precondensate to effect polycondensation at a suitable temperature and pressure to prepare a high molecular weight polyester and in a third step, further increasing the molecular weight and viscosity of the polyester under solid state polymerization conditions of a suitable temperature and pressure, where a metal catalyst is added at one or more points
prior to, at the start of or during the first step or
prior to, at the start of or during the second step and
where a phosphinic acid compound is added at one or more points
prior to, at the start of or during the first step,
prior to, at the start of or during the second step or
towards the end of the second step,
where the phosphinic acid compounds are of formula I, II or III

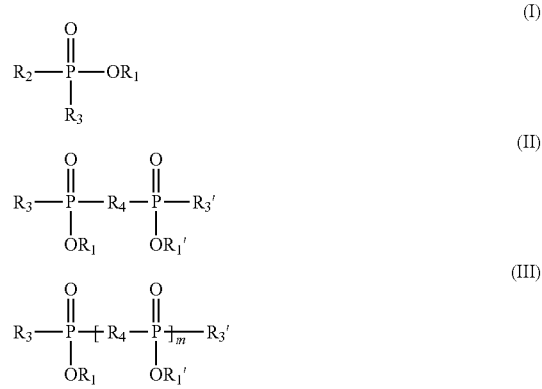

where
$R_1$ and $R_1'$ are independently
hydrogen;
$C_6$-$C_{12}$aryl;
straight or branched chain $C_1$-$C_{60}$alkyl;
straight or branched chain $C_2$-$C_{60}$alkyl interrupted by one to three —O—, —NR—, —COO—, —OCO—, —CONR— or $C_6$-$C_{12}$arylene groups;
straight or branched chain $C_1$-$C_{50}$alkyl substituted by one to three —OR, —NRR', —COOR, —CONRR' or $C_6$-$C_{12}$aryl groups;

straight or branched chain $C_2$-$C_{50}$alkyl both interrupted and substituted by one to six of said groups;

where each of the aryl or arylene groups are unsubstituted or are substituted by one to three straight or branched chain $C_1$-$C_{12}$alkyl or —OR groups;

—$(CH_2CH_2O)_n$—$CH_2CH_2OH$ where n is from 1 to 100;

or $R_1$ and $R_1'$ are an alkali or alkali earth metal;

$R_2$ is $C_5$-$C_{18}$cycloalkyl;

straight or branched chain $C_{22}$-$C_{50}$alkyl;

straight or branched chain $C_{22}$-$C_{50}$alkyl substituted by $C_6$-$C_{12}$aryl;

straight or branched chain $C_2$-$C_{50}$alkyl interrupted by one to three —O—, —NR—, —COO—, —OCO—, —CONR—, $C_6$-$C_{12}$arylene, $C_5$-$C_{18}$cycloalkylene or $C_5$-$C_{18}$cycloalkenylene groups;

straight or branched chain $C_1$-$C_{50}$alkyl substituted by one to three —OR, —NRR', —COOR, —CONRR' groups;

straight or branched chain $C_2$-$C_{50}$alkyl both interrupted and substituted by one to six of said groups;

straight or branched chain $C_1$-$C_{50}$alkyl substituted by $C_6$-$C_{12}$aryl which is substituted by one to three straight or branched chain $C_1$-$C_{12}$alkyl or —OR groups;

$C_6$-$C_{12}$aryl substituted by one to three straight or branched chain $C_4$-$C_{12}$alkyl or —OR groups;

—$(CH_2CH_2O)_n$—$CH_2CH_2OH$ where n is from 1 to 100; or 3-oxo-1,3-dihydroisobenzofuran-1-yl which is unsubstituted or is substituted by one to three straight or branched chain $C_1$-$C_{12}$alkyl, —OR or —COOR groups; or $R_3$ and $R_3'$ are independently hydrogen;

$C_5$-$C_{18}$cycloalkyl;

$C_6$-$C_{12}$aryl;

straight or branched chain $C_1$-$C_{50}$alkyl;

straight or branched chain $C_2$-$C_{50}$alkyl interrupted by one to three —O—, —NR—, —COO—, —OCO—, —CONR—, $C_6$-$C_{12}$arylene, $C_5$-$C_{18}$cycloalkylene or $C_5$-$C_{18}$cycloalkenylene groups;

straight or branched chain $C_1$-$C_{50}$alkyl substituted by one to three —OR, —NRR', —COOR, —CONRR' or $C_6$-$C_{12}$aryl groups;

straight or branched chain $C_2$-$C_{50}$alkyl both interrupted and substituted by one to six of said groups;

where each of the aryl or arylene groups are unsubstituted or are substituted by one to three straight or branched chain $C_1$-$C_{12}$alkyl or —OR groups;

—$(CH_2CH_2O)_n$—$CH_2CH_2OH$ where n is from 1 to 100; or 3-oxo-1,3-dihydroisobenzofuran-1-yl which is unsubstituted or is substituted by one to three straight or branched chain $C_1$-$C_{12}$alkyl, —OR or —COOR groups;

or, in formula I, $R_1$ and $R_2$ together or $R_2$ and $R_3$ together are (—$CH_2$—)$_n$ where n is an integer of from 3 to 7, or together are (—$CH_2$—)$_n$ which is annulated with 1 or 2 phenylene groups;

or, in formulae II or III, $R_1$ and $R_3$ together or $R_1'$ and $R_3'$ together or $R_1$ and $R_3$ together and $R_1'$ and $R_3'$ together are (—$CH_2$—)$_n$ where n is an integer of from 3 to 7, or together are (—$CH_2$—)$_n$ which is annulated with 1 or 2 phenylene groups;

R and R' are independently hydrogen or straight or branched chain $C_1$-$C_{12}$alkyl;

$R_4$ is straight or branched chain $C_1$-$C_{50}$alkylene;

straight or branched chain $C_1$-$C_{50}$alkylene substituted by one to three —OR, —NRR', —COOR, —CONRR' or $C_6$-$C_{12}$aryl groups;

straight or branched chain $C_2$-$C_{50}$alkylene interrupted by one to three —O—, —NR—, —COO—, —OCO—, —CONR—, $C_6$-$C_{12}$arylene or $C_5$-$C_{18}$cycloalkylene groups;

straight or branched chain $C_2$-$C_{50}$alkyene both interrupted and substituted by one to six of said groups;

$C_5$-$C_{18}$cycloalkylene which is unsubstituted or is substituted by one to three $C_1$-$C_6$alkyl, —OR, —NRR', —COOR, —CONRR' or $C_6$-$C_{12}$aryl groups;

$C_5$-$C_{18}$cycloalkylene which is interrupted by one to three —O—, —NR—, —COO—, —OCO—, —CONR— or $C_6$-$C_{12}$arylene groups;

$C_5$-$C_{18}$cycloalkylene which is both interrupted and substituted by one to six of said groups;

$C_6$-$C_{50}$alkylenecycloalkylene; or $C_6$-$C_{12}$arylene;

where each of the aryl or arylene groups are unsubstituted or are substituted by one to three straight or branched chain $C_1$-$C_{12}$alkyl or —OR groups;

and m is from 2 to 100.

DETAILED DESCRIPTION

The dicarboxylic acid is selected from the group consisting of aromatic dicarboxylic acids having 8 to 14 carbon atoms, aliphatic dicarboxylic acids having 4 to 12 carbon atoms, cycloaliphatic dicarboxylic acids having 8 to 12 carbon atoms, and mixtures thereof.

The $C_1$-$C_4$ dicarboxylic diesters are dialkyl diesters of the above-mentioned dicarboxylic acids. The diesters are for instance dimethyl diesters.

Preferably such diacids are terephthalic acid, isophthalic acid, o-phthalic acid, naphthalene dicarboxylic acid, cyclohexane dicarboxylic acid, cyclohexanediacetic acid, diphenyl-4,4'-dicarboxylic acid, succinic acid, maleic acid, glutaric acid, adipic acid, sebacic acid or mixtures thereof.

Especially preferred acids and esters are terephthalic acid, dimethyl terephthalate, isophthalic acid and 2,6-naphthalene dicarboxylic acid.

The diols or glycols are derived from the generic formula HO—R—OH where R is an aliphatic, cycloaliphatic or aromatic moiety of 2 to 18 carbon atoms.

Such diols are for example ethylene glycol, diethylene glycol, triethylene glycol, propane-1,3-diol, propane-1,2-diol, butane-1,4-diol, pentane-1,5-diol, hexane-1,6-diol, 1,4-cyclohexanedimethanol, 3-methylpentane-2,4-diol, 2-methylpentane-1,4-diol, 2,2-diethylpropane-1,3-diol, 1,4-di (hydroxyethoxy)benzene, 2,2-bis(4-hydroxycyclohexyl)-propane, 2,4-dihydroxy-1,1,3,3-tetramethylcyclobutane, 2,2-bis-(3-hydroxyethoxyphenyl)propane, 2,2-bis-(4-hydroxypropoxyphenyl)ethane or mixtures thereof.

Preferably, the dial is ethylene glycol, 1,4-cyclohexanedimethanol or butane-1,4-diol.

The polyester is preferably poly(ethylene terephthalate) PET or poly(ethylene-2,6-naphthalene-dicarboxylate) or poly(1,4-butylene terephthalate); most preferably poly(ethylene terephthalate).

The polyesters are prepared by methods well known in the art. Such methods are disclosed for example in U.S. published app. Nos. 2003083191 and 2004058805 and in the U.S. Pat. Nos. 5,744,571, 6,013,756, 5,453,479 and 7,205,379. These disclosures are incorporated herein by reference.

The first esterification or transesterification step is performed by mixing together one or more dicarboxylic acids or dicarboxylic diesters with one or more diols at temperatures in the range of about 150 to about 300° C., for example from about 200 to about 300° C., from about 260 to about 300° C., and at pressures of from up to 60 psig to atmospheric to about 0.2 mm Hg. The product of this step is a low molecular weight precondensate.

In the second step, polycondensation is effected by increasing the temperature and lowering the pressure while excess diol is removed. The temperature is for example from about 250 to about 300° C., for example from about 275 to about 300° C. The pressure is reduced to from about 10 to about 0.1 torr, or from about 5 to about 0.5 torr. The product is a high molecular weight polyester. The polyester has for example an IV of from about 0.55 to about 0.65 dL/g.

When the polycondenstation (polymerization) process of step 2 is completed, the resulting polyester, which is in the form of a melt, is generally filtered and is typically extruded and pelletized.

For example, the polyester melt may be extruded into polyester filaments, pellets, chips or other articles (primary extrusion step). Preferably, the polyester melt is extruded shortly or immediately after exiting the polycondensation step, whereupon it is quenched, for example in a water trough or alternative cooling unit. The formation of pellets or chips is particularly convenient for storage, transport and handling purposes.

In the third solid state polymerization (SSP) step, the high molecular weight polyester, in the form of for example chips or pellets obtained from the second step, is subjected to high temperatures and low pressure to effect a further increase in molecular weight and viscosity.

The solid state polymerization step is for example as is taught in U.S. Pat. Nos. 6,160,085 and 7,205,379 and published U.S. app. No. 20051272906, the contents of which are hereby incorporated by reference.

The SSP step is for example carried out at from about 190 to about 230° C., for example from about 195 to about 225° C. The pressure is for example reduced to from about 0.1 torr to about 50 torr, for instance from about 0.5 torr to about 10 torr. The temperature, pressure and reaction time may be suitably selected so that polyester having the desired physical properties will be formed.

The SSP step may be performed under an inert gas such as nitrogen, argon or carbon dioxide.

The currently used plants use single or multiple vertical cylindrical reactors 10 to 30 meters in height. In those plants the reactor is operated at a temperature of between about 200 and about 230° C. and a polyester granules moving velocity of 1.00 to 2.52 meters per hour. Within these ranges of temperature, bed height, and granule velocity, a most suitable combination of the three variables is chosen to produce product with the desired IV. Said conventional plants are capable of producing polyethylene terephthalate resin with an IV of from about 0.72 to about 0.86 dL/g, or up to 1.2 dL/g depending on the end use, employing a PET prepolymer with an IV of from about 0.55 to about 0.65 dL/g. The conventional plants increase polymer IV from about 0.12 to about 0.25 dL/g.

The SSP rates of metal catalyzed polyester to achieve a desired molecular weight build up or viscosity increase are significantly enhanced with the presence of phosphinic acid compounds. The polyester pellets, chips or granules obtained after the SSP step exhibit low levels of acetaldehyde formation. They exhibit excellent color, that is high brightness and low yellow color according to the well known L, a, b color parameters.

The polyester pellets, chips or granules are then re-melted and re-extruded or injection molded to form the final articles, that is bottles, filaments, sheets, molded articles and the like.

The extrusion and injection molding conditions are conventional. For example, the polyester may be extruded at a temperature in the range of about 240 to about 315° C. There is low aldehyde formation during this subsequent melt processing. The final articles also exhibit excellent color according to the L, a, b color parameters.

One or both of the first two steps is performed in the presence of a metal catalyst. The metal catalyst is employed at a level of from about 1 to about 1500 ppm by weight metal, based on the total weight of dicarboxylic acid or dicarboxylic diester and dial. For example, the present metal catalyst is employed from about 1 to about 1000 ppm metal or from about 1 to about 500 ppm metal, based on the total weight of dicarboxylic acid or dicarboxylic diester and diol. For example, the metal catalyst is employed from about 2 to about 250 ppm by weight metal, for instance from about 5 to about 300 ppm by weight metal, based on the weight of diacid or diester plus diol.

The third SSP step is performed in the presence of a phosphinic acid catalyst. The phosphinic acid compound is employed at a level of from about 50 ppm to about 10,000 ppm by weight, based on the weight of dicarboxylic acid or dicarboxylic diester and dial. For example, the present phosphinic acid compound is employed from about 100 ppm to about 5000 ppm by weight or from about 500 ppm to about 2500 ppm by weight, based on the total weight of diacid or diester plus dial.

For example, the phosphinic acid compound is added at a point prior to, at the start of or during the first esterification or transesterification step.

For example, the phosphinic acid compound is added at a point prior to, at the start of or during the second polycondensation step.

For example, the phosphinic acid compound is added at a point towards the end of the polycondensation step.

For example, the phosphinic acid compound is added in some combination of the above points of addition.

"Towards the end of the polycondensation step" is when one or more of the following conditions are satisfied or thereafter and before solidification of the polyester melt:

a) the polyester melt reaches an IV of at least 0.50 dL/g or b) vacuum applied to the polyester melt, if any, is at least partially released or c) if the polyester melt is present in a melt phase polymerization process, adding the phosphinic acid compound within a final reactor for making the polyester polymer or between the final reactor and before a cutter for cutting the polyester melt or d) if the polyester melt is present in a melt phase polymerization process, following at least 85% of the time for polycondensing the polyester melt or e) the IV of the polyester melt is within 0.10 dL/g of the IV obtained upon solidification or f) at a point within 20 minutes or less of solidification of the polyester melt.

The metal catalyst is added at a point prior to, at the start of or during the first esterification or transesterification step.

The metal catalyst is added at a point prior to, at the start of or during the second polycondensation step.

For example, the metal catalyst is added in some combination of the above points of addition.

The metal catalysts are known polyester catalysts and are for instance antimony catalysts, germanium catalysts or titanium catalysts.

Metal catalysts are for instance antimony oxide ($Sb_2O_3$) or germanium oxide ($GeO_2$).

Aluminum and cobalt compounds are also known as metal catalysts.

Titanium catalysts are for instance organic titanates, or alkyl titanates, and include acetyl triisopropyl titanate, titanium(IV) isopropoxide, titanium glycolate, titanium(IV) butoxide, hexyleneglycol titanate, tetraisooctyl titanate, titanium tetramethylate, titanium tetrapropylate, titanium(IV) 2-ethylhexoxide, titanium(IV) (triethanolaminato)-isopropoxide or tetraethylhexyltitanate.

The organic titanates are for example of the formula $Ti(OR)_4$ where R is a ligand group typically composed of carbon, oxygen, phosphorus, silicon and/or hydrogen. Typically each R ligand group can contain at least one carbon, preferably 3 or more. The presence of a halide, or of other active substituent, in the ligand group generally is avoided since such groups may interfere with catalytic reactions or form undesired by-products, which would contaminate the polymer. While different ligand groups may be present on the same titanium atom, generally they can be identical to facilitate synthesis of the titanate. In some cases, 2 or more R's may be from a common compound chemically bonded together, other than at the titanium (i.e., a multidentate ligand such as triethanolamine, citric acid, glycolic acid, malic acid, succinic acid or ethanediamine). For example, R is a straight or branched chain alkyl of from 1 to 12 carbon atoms.

Organic titanates are commonly prepared by mixing titanium tetrachloride and the selected alcohol precursor in the presence of a base, such as ammonia, to form the tetraalkyl titanate. The alcohol typically is ethanol, n-propanol, isopropanol, n-butanol or isobutanol. Methanol generally is not selected since the resulting tetramethyl titanate is insoluble in the reaction mass, complicating its isolation.

Tetraalkyl titanates thereby produced are recovered by first removing by-product ammonium chloride (e.g., by filtration) and then distilling the tetraalkyl titanate from the reaction mass. This process generally is limited to the production of titanates having $C_4$ or shorter alkyl groups since the higher temperatures required to distill longer chain titanates (e.g. tetra-2-hexyl titanate) cause some degradation of the titanate. Titanates having longer alkyl groups are conveniently prepared by transesterification of those having alkyl groups up to $C_4$ with longer chain alcohols. As a practical matter, the selected tetraalkyl titanate generally will have alkyl chains less than $C_{12}$ since solubility of the titanate tends to decrease, and fabrication cost tends to increase as the number of carbons increases.

Representative commercial organic titanates are for example sold under the trademark TYZOR available from DuPont or VERTEC from Johnson Matthey.

The phosphinic acid compounds are mono-, bis- or polyphosphinic acid compounds of formulae I, II or III.

For example, the phosphinic acid compound is of the formula I and where $R_2$ is
straight or branched chain $C_1$-$C_{50}$alkyl substituted by $C_6$-$C_{12}$aryl which is substituted by one to three straight or branched chain $C_4$-$C_{12}$alkyl or —OR groups;
$C_6$-$C_{12}$aryl substituted by one to three straight or branched chain $C_4$-$C_{12}$alkyl or —OR groups;
or $R_2$ is 3-oxo-1,3-dihydroisobenzofuran-1-yl which is unsubstituted or is substituted by one to three straight or branched chain $C_1$-$C_{12}$alkyl, —OR or —COOR groups.

For instance, the phosphinic acid is of formula II or III.

For instance, the phosphinic acid is of formula II or III and $R_3$ and $R_3'$ are
$C_6$-$C_{12}$aryl;
straight or branched chain $C_1$-$C_{50}$alkyl;
straight or branched chain $C_2$-$C_{50}$alkyl interrupted by one to three —O—, —NR—, —COO—, —OCO—, —CONR—, $C_6$-$C_{12}$arylene, $C_5$-$C_{18}$cycloalkylene or $C_5$-$C_{18}$cycloalkenylene groups;
straight or branched chain $C_1$-$C_{50}$alkyl substituted by one to three —OR, —NRR', —COOR, —CONRR' or $C_5$-$C_{12}$aryl groups;
straight or branched chain $C_2$-$C_{50}$alkyl both interrupted and substituted by one to six of said groups;
where each of the aryl or arylene groups are unsubstituted or are substituted by one to three straight or branched chain $C_1$-$C_{12}$alkyl or —OR groups;
or $R_3$ and $R_3'$ are 3-oxo-1,3-dihydroisobenzofuran-1-yl which is unsubstituted or is substituted by one to three straight or branched chain $C_1$-$C_{12}$alkyl, —OR or —COOR groups.

$C_6$-$C_{12}$aryl is for example phenyl, naphthyl or biphenyl.

$C_6$-$C_{12}$aryl substituted by one to three $C_1$-$C_{12}$alkyl or —OR groups is for instance tolyl, xylyl, o-, p- or m-phenol, or is the group

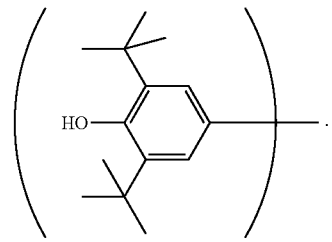

Arylene is a divalent version of aryl.

$C_5$-$C_{18}$cycloalkyl is for example cyclopentyl, cyclohexyl, cycloheptyl, cyclooctyl and also includes bicyclic or polycyclic groups such as

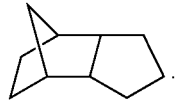

Cycloalkylene is a divalent version of cycloalkyl. Cycloalkenylene is a divalent, unsaturated version of cycloalkyl.

Alkyl is a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 2,4,4-trimethylpentyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, icosyl or docosyl.

Alkylene is a divalent version of alkyl.

3-oxo-1,3-dihydroisobenzofuran-1-yl or phthalide is the group

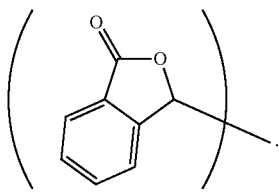

$C_6$-$C_{50}$alkylenecycloalkylene is a divalent alkylcycloalkyl group terminated at each of the alkyl and cycloalkyl radicals, for example:

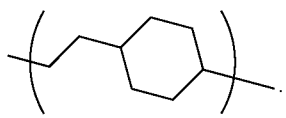

Alkali and alkali earth metals are for instance Li, Na, K, Mg, Ca or Ba. Where the metal is divalent, it will be satisfied by two phosphinyloxy groups.

Examples of when in formula I, $R_1$ and $R_2$ together or $R_2$ and $R_3$ together are (—$CH_2$—)$_n$ where n is an integer of from 3 to 7, or together are (—$CH_2$—)$_n$ which is annulated with 1 or 2 phenylene groups;

or, in formulae II or III, $R_1$ and $R_3$ together or $R_1'$ and $R_3$ together or $R_1$ and $R_3$ together and $R_1'$ and $R_3'$ together are (—$CH_2$—)$_n$ where n is an integer of from 3 to 7, or together are (—$CH_2$—)$_n$ which is annulated with 1 or 2 phenylene groups, are:

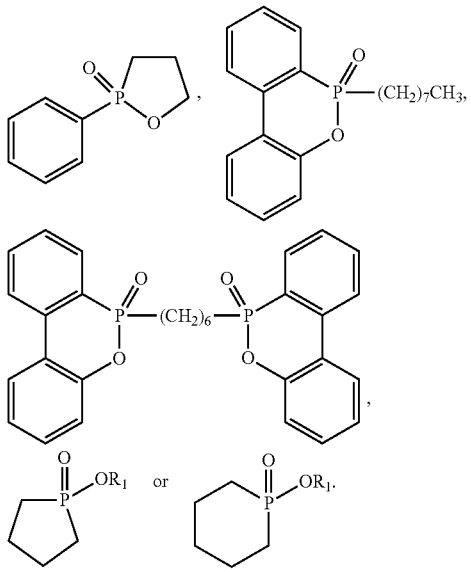

The term "together are (—$CH_2$—)$_n$" means "ring forming with methylene groups".

Novel phosphinic acid compounds of formulae I, II and III are a further subject of this invention. Some of the compounds are known and are excluded. The compounds

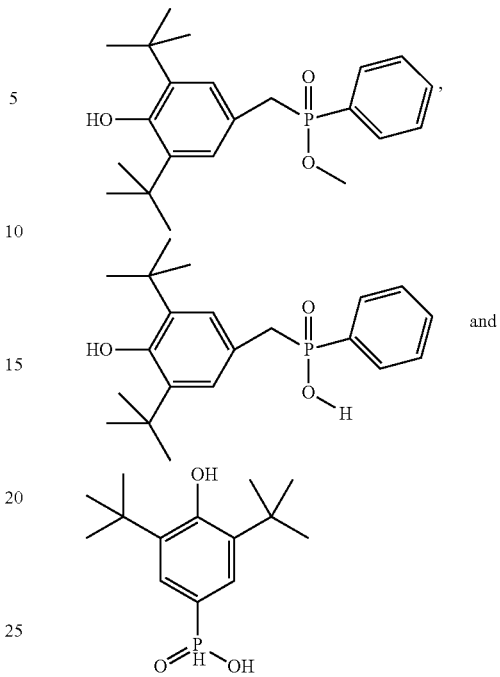

are known from U.S. Pat. Nos. 3,534,127, 3,488,368 and 3,402,196.

The compound

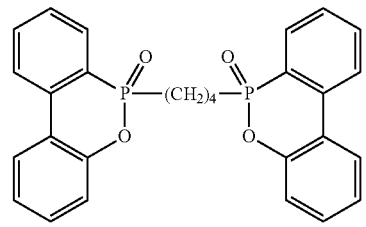

is known.

A further subject of the invention are polyester compositions comprising the present phosphinic acid compounds. Accordingly, also disclosed is a composition comprising
a polyester and
a phosphinic acid compound of formula I, II or III.

Molded articles prepared from the polyester compositions are a further subject of this invention. Accordingly, also disclosed are molded articles comprising
a composition comprising
a polyester and
a phosphinic acid compound of formula I, II or III.

Molded articles are prepared by convention methods such as extrusion, melt spinning, injection molding, blow molding and the like. Molded articles are for instance films, fibers and articles such as bottles and the like.

EXAMPLES

The following Examples further illustrate the invention. All parts and percentages are by weight unless otherwise indicated.

Synthetic Examples

Example S1

{6-[Hydroxy-(3-octyloxy-propyl)-phosphinoyl]-hexyl}-(3-octyloxy-propyl)-phosphinic acid (101)

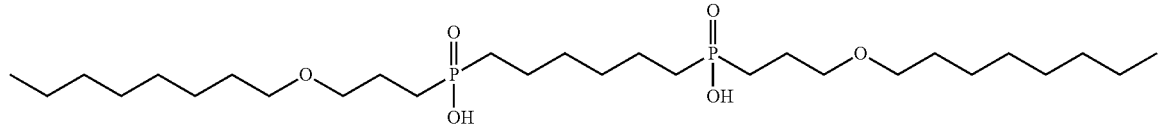

(101)

a) Preparation of allyloxyoctane

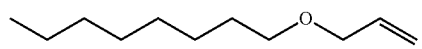

A mixture of 30 g (0.230 mols) of 1-octanol in 60 mL dry THF is combined with 18 g NaH (60%, washed with 2×50 mL n-heptane) and the resultant mixture is refluxed for 1 h. The reaction mixture is cooled down to 10° C. and 50 g (0.41 mols) of allyl bromide is added portion-wise over 15 min. After 3 h at reflux, the reaction mixture is cooled to 0° C. and the excess NaH is destroyed by adding water. The reaction mixture is diluted with n-heptane. The organic layer is washed with satd. NaCl solution, dried and evaporated to give 37 g of crude oil (93% yield). $^1$H NMR confirms formation of the allyloxyoctane.

b) Preparation of (3-octyloxy-propyl)-phosphinic acid

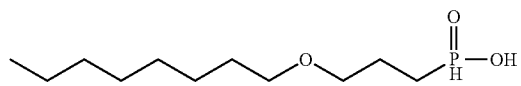

Allyloxyoctane of step a) (15 g, 0.0882 mols), 50% hypophosphorous acid (15 mL, 0.0882 mols) and tert-butyl perbenzoate (1 mL) in 100 mL isopropyl alcohol are heated at 100° C. for 26 hrs. After completion of the reaction, a mixture of 200 mL n-heptane and water (1:1) is added and the mixture is stirred for 30 minutes. The organic phase is separated and is washed with water. It is dried over $Na_2SO_4$ and concentrated to give 16.2 g of oily product. The characterization of the crude material by $^1$H and $^{31}$P NMR shows the formation of product with 63% purity.

c) Preparation of {6-[hydroxy-(3-octyloxy-propyl)-phosphinoyl]-hexyl}-(3-octyloxy-propyl)-phosphinic acid (101)

22 g of crude product of step b) (0.093 mols), 3.8 g of 1,5-hexadiene (0.046 mols) and 5.0 g dibenzoyl peroxide (75%, 0.0082 mols) in 75 mL 1,4-dioxane are heated at 82° c. for 20 h. The reaction mixture is concentrated by removing 1,4-dioxane on rotary evaporator. After completion of the reaction the mixture is poured into 300 mL n-heptane to give a white colored solid (4.6 g) in 18% yield. It is characterized by $^1$H and $^{31}$P NMR.

Example S2

{6-[Hydroxy-(2,4,4-trimethyl-pentyl)-phosphinoyl]-hexyl}-(2,4,4-trimethyl-pentyl)-phosphinic acid (102)

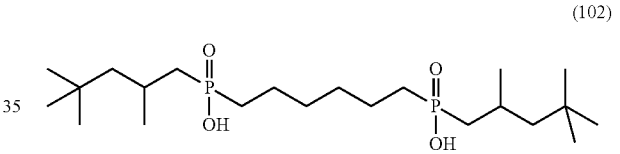

(102)

a) Preparation of (2,4,4-trimethyl-pentyl)-phosphinic acid

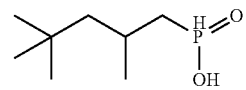

A mixture of diisobutylene (112 g, 1 mol) and hypophosphorous acid (30%, 230 mL) are reacted in the presence of t-butyfperbenzoate. After aqueous work up, 45 g of oily product are obtained. It is characterized by $^1$H NMR and $^{31}$P NMR which shows formation of product (64% pure).

b) Preparation {6-[hydroxy-(2,4,4-trimethyl-pentyl)-phosphinoyl]-hexyl}-(2,4,4-trimethyl-pentyl)-phosphinic acid (102)

26 g of crude iso-octyl phosphinic acid (0.146 mols) and 5.8 g of 1,5-hexadiene (0.070 mols) in 1,4-dioxane are reacted in the presence of 7 g of dibenzoyl peroxide at 90° C. for 24 h. After completion of the reaction, the mixture is poured into a 1:1 mixture of water and n-heptane. The organic phase is separated and washed with water, dried over $Na_2SO_4$ and concentrated. The pure product (101) is finally obtained by column chromatography. It is characterized by spectral data. 2 g of solid and 8.5 g of sticky material are obtained.

Example S3

Bis {4-[2-(hydroxy-octyl-phosphinoyl)-ethyl]-cyclohexyl}-octyl-phosphinic acid (103)

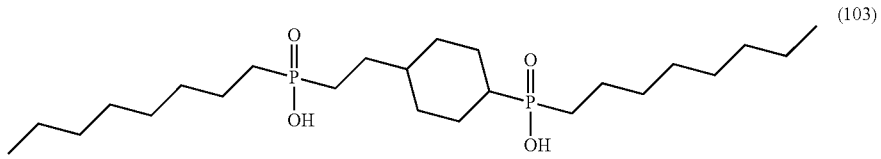 [SMILES: CCCCCCCCP(=O)(O)CCC1CCC(P(=O)(O)CCCCCCCC)CC1]

a) Preparation of n-octyl-phosphinic acid

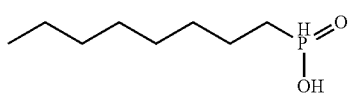

In a round bottom flask, 1 L (715 g, 6.38 mots) of 1-octene and 1.3 L (12.76 mols) of hypophosphorus acid (50% aqueous solution), 50 mL of tert-butyl perbenzoate, as initiator, and 1.7 L of 2-propanol as solvent are stirred at 80° C. for 7 h. The completed reaction mixture is combined with 2.0 L of water and 2.0 L of n-heptane. The mixture is separated and the organic phase is further washed with 1 L water. The water layer is further washed with 1 L of heptane and all the heptane layers are combined. This mixture is treated with 1 kg of anhydrous sodium sulfate and the solvent is evaporated to obtain 1.12 kg of crude n-octyl phosphinic acid with 85% purity ($^{31}$P NMR).

b) Preparation of {4-[2-(hydroxy-octyl-phosphinoyl)-ethyl]-cyclohexyl}-octyl-phosphinic acid (103)

25 g (0.125 mols) of n-octyl phosphinic acid, 6.6 g (0.07 mols) of 4-vinyl-1-cyclohexene, 7 g dibenzoyl peroxide (75% pure) and 50 mL of 1,4-dioxane are stirred at 90° C. After 8 h, reaction mixture is cooled to room temperature and is added to a mixture of n-heptane and water. The organic layer is separated, washed with water and concentrated on a rotary evaporator. A viscous oil is obtained which is subjected to column chromatography. 7 g of the desired product is isolated as a viscous oil. The structure is confirmed by $^{31}$P NMR.

Example S4

[6-(Hydroxy-octyl-phosphinoyl)-hexyl]-octyl-phosphinic acid (104)

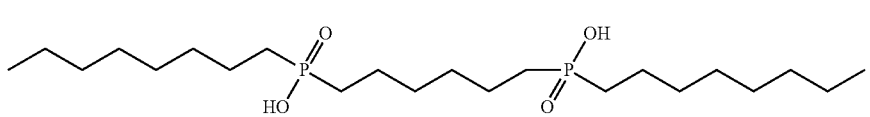

50 g (0.238 moles) of n-octyl phosphinic acid, 12.13 ml (0.107 moles) of 1,5-hexadiene, 15.4 g (0.0476) dibenzoyl peroxide (75% pure) and 100 ml of toluene are stirred at 85° C. for 24 h. After cooling the reaction mixture at room temperature, the solid is precipitated out which is filtered and further washed with toluene and heptane and dried in an oven. 21.0 g of dry product is obtained with 46% yield. Characterization of solid by $^1$H and $^{31}$P NMR confirms the formation of desired product.

Example S5

10-(Hydroxy-phenyl-phosphinoyl)-octadecanoic acid methyl ester (105)

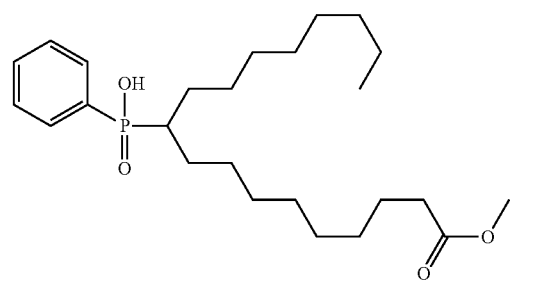 [SMILES: CCCCCCCCC(CCCCCCCCC(=O)O)P(=O)(O)c1ccccc1]

A 100 mL round bottom flask, equipped with a reflux condenser connected to an argon inlet through a firestone valve and a magnetic stir bar is charged with 4.45 grams (15 mmol) of methyl oleate and 2.13 grams (15 mmol) of phenylphosphinic acid. Into the resultant stirred suspension is added 0.16 mL (0.75 mmol) of di-tert-amyl peroxide. The flask is flushed with argon 5 times then the oil bath temperature is raised to 140° C. and kept at 140° C. for 5 hours. The flask is put under vacuum to remove any tert-amyl alcohol that formed during the reaction. A clear light yellow viscous liquid is obtained at 6.36 grams (97% of theory).

Compounds (106)-(110) are prepared in a similar manner to that of compound (105):

| Example | Structure/Compound | Form | Melting Point |
|---|---|---|---|
| S6 | (106) | White solid | 130-133° C. |
| S7 | (107) | Light yellow viscous oil (gel) | |
| S8 | (108) | White wax | 67-71° C. |
| S9 | (109) | Light yellow resin | |
| S10 | (110), $n = 3\text{-}9$ | Light yellow viscous oil | |

Example S11

Bis-(3-oxo-1,3-dihydro-isobenzofuran-1-yl)-phosphinic acid (111)

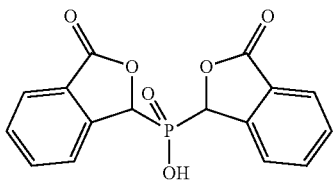

(111)

Into a suspension of 30.1 grams (0.2 moles) of 2-carboxybenzaldehyde in 220 mL of toluene is added 10.4 mL (0.1 moles) of 50% aqueous hypophosphorous acid. The resultant mixture is heated to reflux and 9 mL of water is collected by azeotropic distillation using a Dean-Stark receiver. Upon cooling the reaction mixture, the precipitated white solid is collected by filtration and dried to give 30.2 grams (91% yield) of bis-(3-oxo-1,3-dihydro-isobenzofuran-1-yl)-phosphinic acid as a white powder, mp 280-285° C.

Example S12

(3,5-Di-tert-butyl-4-hydroxy-benzyl)-phosphinic acid butyl ester (112)

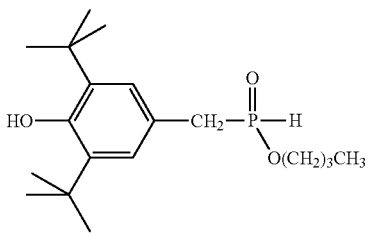

(112)

Butyl hypophosphite (CAS REG #18108-09-3) is prepared from 13.2 grams (0.1 moles) of 50% aqueous hypophosphorous acid and 27 mL of 1-butanol in 100 mL of cyclohexane with removal of water by azeotropic distillation using a Dean-Stark receiver. After concentration in vacuo, the reaction mixture containing butyl hypophosphite is mixed with 52.69 grams (0.2 moles) of 2,6-di-tert-butyl-4-(dimethylaminomethyl)phenol in 200 mL of toluene. Into the resultant reaction solution is added 19 mL of acetic anhydride and the reaction is heated to 100° C. for 5 hours. The reaction mixture is concentrated in vacuo to give 55 grams of crude reaction mass which is further purified by chromatography (silica gel; hexane/ethyl acetate eluant) to give 13.2 grams (39% yield) of a yellow solid. The yellow solid is recrystallized from 40 mL of hot heptane to give 10 grams (29% yield) of (3,5-di-tert-butyl-4-hydroxy-benzyl)-phosphinic acid butyl ester as a white solid, mp 85-87° C.

Example S13

Bis-(3,5-di-tert-butyl-4-hydroxy-benzyl)-phosphinic acid butyl ester (113)

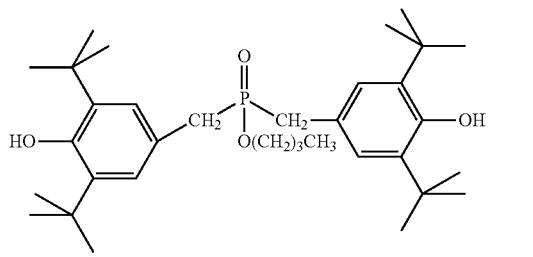

(113)

Into a cooled suspension of 1 gram (25 mmol) of 60% dispersion of sodium hydride in 10 mL of tetrahydrofuran at 0° C. is added dropwise a solution of 4.26 grams (12.5 mmol) (3,5-di-tert-butyl-4-hydroxy-benzyl)-phosphinic acid butyl ester in 15 mL of tetrahydrofuran. The reaction mixture is allowed to warm to ambient temperature to complete sodium salt formation. The resultant suspension is cooled again to 5° C. and a solution of 6.4 grams (25 mmol) of 3,5-di-tert-butyl-4-hydroxybenzyl chloride (CAS REG #955-01-1) in 15 mL of tetrahydrofuran is added. The resultant mixture is warmed to ambient temperature and stirred for 2 hours. After 2 hours the reaction mixture is poured onto 100 mL of ice and the resultant mixture is extracted with two portions of 100 mL of ether. The combined ether layers are washed with 50 mL of brine and then dried over sodium sulfate. Evaporation of solvent gives 9.72 grams of orange residue which is purified by chromatography (silica gel; hexane/ethyl acetate eluant) and then crystallized from pentane to give 2.5 grams (35% yield) of bis-(3,5-di-tert-butyl-4-hydroxy-benzyl)-phosphinic acid butyl ester as a white solid, mp 133-135° C.

Example S14

(3,5-Di-tert-butyl-4-hydroxy-benzyl)-phenyl-phosphinic acid methyl ester (114)

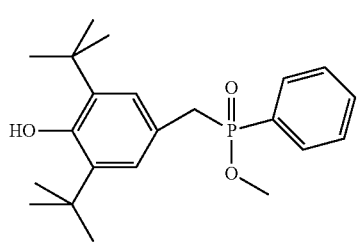

(114)

A mixture of 5 grams (29 mmol) of dimethylphenylphosphonite with 7.5 grams (29 mmol) of 3,5-di-tert-butyl-4-hydroxybenzyl chloride (CAS REG #955-01-1) is heated at 110° C. for 1 hour and cooled to obtain a white solid. The resultant solid is crystallized from 100 mL of hexane to give 9 grams (83% yield) of (3,5-di-tert-butyl-4-hydroxy-benzyl)-phenyl-phosphinic acid methyl ester as a white solid mp 112-114° C.

Example S16

(3,5-Di-tert-butyl-4-hydroxy-benzyl)phenyl-phosphinic acid (115)

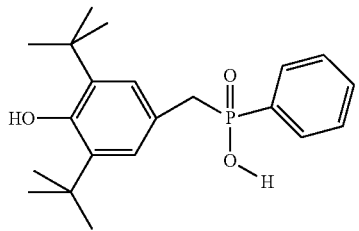

A mixture of 20.4 grams (54 mmol) of (3,5-di-tert-butyl-4-hydroxy-benzyl)-phenyl-phosphinic acid methyl ester in 100 mL of 2.5 N sodium hydroxide solution is heated at 100° C. for 2.5 hours. The reaction mixture is poured onto a mixture of 25 mL of concentrated hydrochloric acid with 200 mL of ice. The product is extracted into 500 mL of chloroform and the chloroform layer is washed with two portions of 200 mL of water and then dried over sodium sulfate. Evaporation of the solvent gives 30 grams of a viscous yellow oil. The crude oil is mixed with 120 mL of hexanes to give 18.4 grams (94% yield) of (3,5-di-tert-butyl-4-hydroxy-benzyl)-phenyl-phosphinic acid as a white powder mp 185-186° C.

Example S16

(3,5-Di-tert-butyl-4-hydroxy-benzyl)-cyclohexyl-phosphinic acid methyl ester (116)

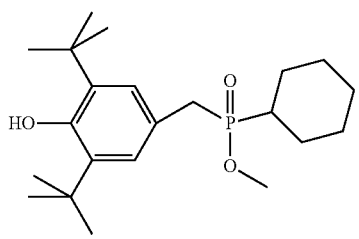

A mixture of 10.47 grams (59 mmol) of dimethylcyclohexylphosphonite with 15.14 grams (59 mmol) of 3,5-di-tert-butyl-4-hydroxybenzyl chloride (CAS REG #955-01-1) in 45 mL of toluene is refluxed for 2 hours and is cooled. The resultant precipitated crystals are collected by filtration, washed with toluene, then hexane and are dried under vacuum to obtain 11.5 grams (51% yield) of (3,5-di-tert-butyl-4-hydroxy-benzyl)-cyclohexyl-phosphinic acid methyl ester as a white solid mp 149-150° C.

Example S17

(3-Oxo-1,3-dihydro-isobenzofuran-1-yl)-phenyl-phosphinic acid (117)

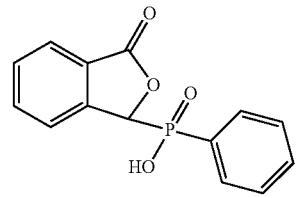

into a suspension of 30.1 grams (0.2 moles) of 2-carboxy-benzaldehyde in 240 mL of toluene is added 28.4 grams (0.2 moles) of phenylphosphinic acid. The resultant mixture is heated to reflux and 3.8 mL of water is collected by azeotropic distillation using a Dean-Stark receiver. Upon cooling the reaction mixture, the precipitated white solid is collected by filtration and dried. The crude solid is recrystallized from 240 mL of methanol to give 31.8 grams (58% yield) of (3-oxo-1,3-dihydro-isobenzofuran-1-yl)-phenyl-phosphinic acid as white crystals, mp 230-233° C.

Example S18

(3,5-Di-tert-butyl-4-hydroxy-benzyl)-phosphinic acid (118)

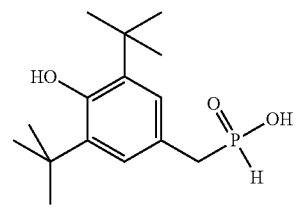

17 grams (50 mmol) of (3,5-di-tert-butyl-4-hydroxy-benzyl)-phosphinic acid butyl ester in a mixture of 100 mL of 2.5 N sodium hydroxide solution and 10 mL of isopropanol is heated at 100° C. for 1 hour. The cooled reaction mixture is poured into a mixture of 25 mL of concentrated hydrochloric acid and 200 mL of ice. The product is extracted into 400 mL of chloroform and the chloroform layer is washed with 200 mL of water and then dried over sodium sulfate. Evaporation of the solvent gives 21 grams of an orange oil. The crude oil is mixed with 20 mL of toluene to give 10.8 grams (76% yield) of (3,5-di-tert-butyl-4-hydroxy-benzyl)-phosphinic acid as a white solid mp 147-149° C.

Example S19

(3,5-Di-tert-butyl-4-hydroxyphenyl)-phosphinic acid (119)

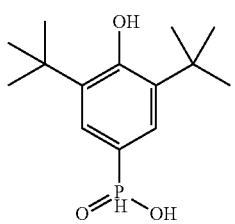
(119)

Into a cooled solution of 8.8 mL (100 mmol) phosphorous trichloride in 15 mL of dichloromethane is added dropwise a solution of 10.3 grams (50 mmol) of 2,6-di-tert-butylphenol and 14.0 mL (100 mmol) of triethylamine in 30 mL dichloromethane over a 1 hour period. After the addition is complete the reaction mixture is heated to reflux for 6 hours and then cooled. The reaction suspension is filtered and the filtrate is concentrated in vacuo. The resultant solid is heated with 200 mL of water for 3 hours and then cooled to ambient temperature. The water is decanted from the reaction mass and the crude product is dissolved into 100 mL of chloroform. The choloroform solution is extracted with 50 mL of water, then dried over sodium sulfate. After filtering off the sodium sulfate, the chloroform is evaporated to give 9.9 grams of off-white solid. The off-white solid is recrystallized from 60 mL of hot cyclohexane to give 5.44 grams (51% yield) of (3,5-di-tert-butyl-4-hydroxyphenyl)-phosphinic acid as a white powder, mp 106-111° C.

Example S20

2,4,4-trimethylpentyl phosphinic acid (120)

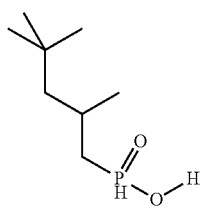
(120)

A 2 L 4-neck flask, equipped with thermocouple well, a dropping funnel, overhead stirrer and reflux condenser is charged with 199 grams (1.88 moles) of sodium hypophosphite monohydrate and 500 mL of 2B ethanol. Into the resultant stirred suspension is added via the dropping funnel, 52 mL (1.87 moles) of concentrated sulfuric acid. During the addition the reaction mixture temperature rises from 21° C. to 27° C. After approximately 15 minutes, 100 mL (0.624 moles) of 2,4,4-trimethyl-1-pentene is added, followed by 10.24 g (0.062 moles) of AIBN powder. The reaction mixture is heated at reflux under a nitrogen atmosphere for 20 hours. An additional 6.84 g (0.042 moles) of AIBN powder is added and the mixture is refluxed under nitrogen for another 20 hours. Solvent is removed under vacuum and the residue is partitioned between 400 mL heptane and 1 L of water. The heptane layer is concentrated under vacuum to give 98 grams (88% of theory) of 2,4,4-trimethylpentyl phosphinic acid as a colorless oil.

Example S21

(11-Hydroxy-undecyl)-(2,4,4-trimethylpentyl)-phosphinic acid (121)

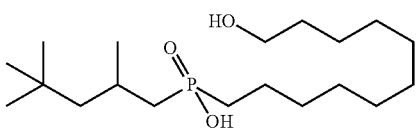
(121)

5 g (0.028 moles) of 2,4,4-trimethylpentyl phosphinic acid, 4.78 g (0.28 moles) of 10-undecen-1-ol and 0.3 mL (0.0014 moles) of di-tert-amylperoxide is mixed in a 50 mL single neck flask. The mixture is purged with argon to remove oxygen and is heated under argon for 5 hours at 140° C. Tert-amyl alcohol is removed by distillation and 9.8 g (quantitative yield) of (11-hydroxy-undecyl)-(2,4,4-trimethylpentyl)-phosphinic acid is obtained as a viscous oil.

Compounds (122) and (123) are prepared in a similar manner to that of (121):

| Example | Structure/Compound | Form |
|---|---|---|
| S22 | 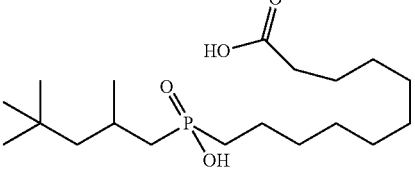 (122) | oil |
| S23 | 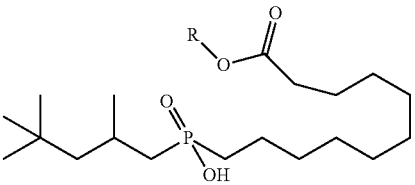 R = Me/Et  A mixture of ethyl and methl esters (123) | oil |

Example S24

10-[Hydroxy-(2,4,4-trimethyl-pentyl)-phosphinoyl]-octadecanoic acid methyl ester (mixture of isomers) (124)

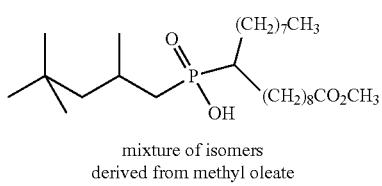

mixture of isomers
derived from methyl oleate 10 g (0.056 moles) of 2,4,4-trimethylpentyl phosphinic acid, 15.82 g (0.056 moles) of methyl oleate (CE-1897 from P&G Chemical) and 0.5 mL (0.0023 moles) of di-tert-amylperoxide are mixed in a 100 mL single neck flask. The mixture is purged with argon to remove oxygen and is heated under argon for 6 hours at 140° C. Tert-amyl alcohol is removed by distillation and 25.8 g (quantitative yield) of 10-[hydroxy-(2,4,4-trimethyl-pentyl)-phosphinoyl]-octadecanoic acid methyl ester is obtained as a slightly yellow oil.

Example S25

Mixture of Dialkylphosphinic Acids from Chevron Phillips Olefin $C_{26}$-$C_{28}$ and 2,4,4-trimethylpentyl Phosphinic Acid (125)

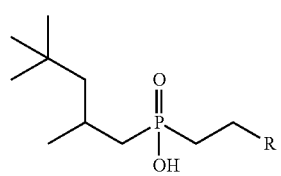

R = $C_{26}$ (avg)

5 g (0.028 moles) of 2,4,4-trimethylpentyl phosphinic acid, 11 g (0.028 moles) of olefin $C_{26}$-$C_{28}$ (ChevronPhillips) and 0.3 mL (0.0014 moles) of di-tert-amylperoxide are mixed in a 50 mL single neck flask. The mixture is purged with argon to remove oxygen and is heated under argon for 5 hours at 140° C. Tert-amyl alcohol is removed by distillation to obtain 16 g (quantitative yield) of product as a solid wax, mp 70-71° C.

Example S26

Mixture of Dialkylphosphinic Acids from Chevron Phillips Olefin $C_{24}$-$C_{28}$ and 2,4,4-trimethylpentyl Phosphinic Acid (126)

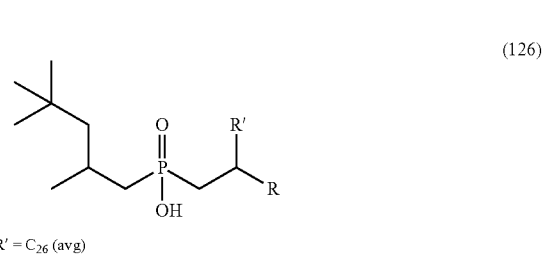

R + R' = $C_{26}$ (avg)

1.5 g (0.0084 moles) of 2,4,4-trimethylpentyl phosphinic acid, 3.3 g (0.0084 moles) of olefin C24-C28 (ChevronPhillips) and 0.18 mL (0.00084 moles) of di-tert-amylperoxide are mixed in a 50 mL single neck flask. The mixture is purged with argon to remove oxygen and is heated under argon for 5 hours at 140° C. Tert-amyl alcohol is removed by distillation and 4.8 g (quantitative yield) of product is obtained as a solid wax, mp 56-58° C.

Example S27

[10-(Hydroxy-(2,4,4-trimethylpentyl)-phosphinoyl]-decyl-(2,4,4-trimethylpentyl)-phosphinic acid (127)

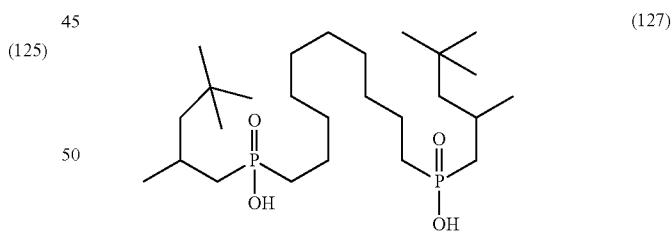

10 g (0.056 moles) of 2,4,4-trimethylpentyl phosphinic acid, 3.7 g (0.027 moles) of 1,9-decadiene and 0.5 mL (0.0023 moles) of di-tert-amylperoxide are mixed in a 50 mL single neck flask. The mixture is purged with argon to remove oxygen and is heated under argon for 6 hours at 140° C. Tert-amyl alcohol is removed by distillation and 13 g (quantitative yield) of [10-(hydroxy-(2,4,4-trimethylpentyl)-phosphinoyl]-decyl-(2,4,4-trimethylpentyl)-phosphinic acid are obtained as a viscous oil.

Example S28

(2,4,4-trimethylpentyl)-3-[oxy(2,3-dihydroxypropyl)]-propyl-phosphinic acid (128)

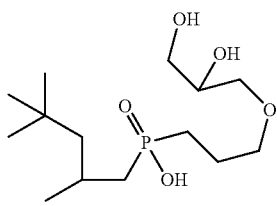
(128)

5 g (0.028 moles) of 2,4,4-trimethylpentyl phosphinic acid, 3.71 g (0.028 moles) of allylglycerol ether and 0.3 mL (0.0014 moles) of di-tert-amylperoxide are mixed in a 50 mL single neck flask. The mixture is purged with argon to remove oxygen and is heated under argon for 6 hours at 140° C. Tert-amyl alcohol is removed by distillation and 8.7 g (quantitative yield) of (2,4,4-trimethylpentyl)-3-[oxy(2,3-dihydroxypropyl)]-propyl-phosphinic acid is obtained as a viscous oil.

Example S29

10-[Hydroxy-(2,4,4-trimethyl-pentyl)-phosphinoyl]-octadecanoic acid (mixture of isomers) (129)

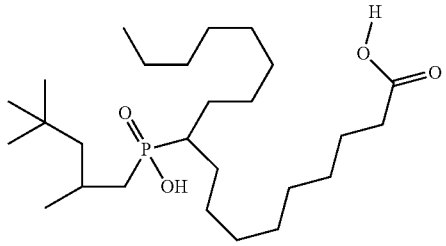
(129)

6.31 g (0.0354 moles) of 2,4,4-trimethylpentyl phosphinic acid, 10 g (0.0354 moles) of oleic acid and 0.25 mL (0.0012 moles) of di-tert-amylperoxide are mixed in a 50 mL single neck flask. The mixture is purged with argon to remove oxygen and is heated under argon for 6 hours at 140° C. Tert-amyl alcohol is removed by distillation and 13.5 g (83% yield) of 10-[hydroxy-(2,4,4-trimethyl-pentyl)-phosphinoyl]-octadecanoic acid is obtained as a viscous oil.

Example S30

{5-[Hydroxy-(2,4,4-trimethylpentyl)-phosphinoyl]-octahydro-4,7-methano-inden-2-yl}-(2,4,4-trimethylpentyl)-phosphinic acid (mixture of isomers) (130)

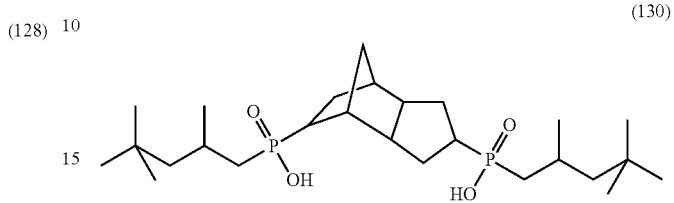
(130)

5 g (0.028 moles) of 2,4,4-trimethylpentyl phosphinic acid, 1.85 g (0.014 moles) of dicyclopentadiene and 0.3 mL (0.0014 moles) of di-tert-amylperoxide are mixed in a 50 mL single neck flask. The mixture is purged with argon to remove oxygen and is heated under argon for 6 hours at 140° C. Tert-amyl alcohol is removed by distillation and 6.19 g (90% yield) of {5-[hydroxy-(2,4,4-trimethylpentyl)-phosphinoyl]-octahydro-4,7-methano-inden-2-yl}-(2,4,4-trimethylpentyl)-phosphinic acid is obtained as an amber glass.

Example S31

9-{Hydroxy-[1-(7-methoxycarbonyl-heptyl)-decyl]-phosphinoyl}-octadecanoic acid methyl ester (mixture of isomers) (131)

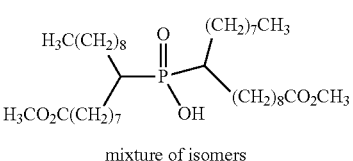
(131)

mixture of isomers
derived from methyl oleate 3.1 mL (0.03 moles) of 50% aqueous hypophosphorous acid and 16.92 g (0.06 moles) of methyl oleate (CE-1897 from P&G Chemical; iodine value=90) are mixed in a 100 mL single neck flask equipped with a distillation head. The mixture is purged with argon to remove oxygen and is heated under argon at 140° C. to remove water. After water is removed the mixture is cooled and 0.5 mL (0.0023 moles) of di-tert-amylperoxide are added and the mixture is purged with argon to remove oxygen and is heated under argon for 5 hours at 140° C. Tert-amyl alcohol is removed by distillation and 18.9 g (quantitative yield) of 9-{hydroxy-[1-(7-methoxycarbonyl-heptyl)-decyl]-phosphinoyl}-octadecanoic acid methyl ester (mixture of isomers) is obtained as a colorless wax melting near ambient temperature.

Example S32

[3-(2-Hydroxymethyl-2-{3-[hydroxy-(2,4,4-trimethylpentyl)-phosphinoyl]-propoxymethyl}-butoxy)-propyl]-(2,4,4-trimethylpentyl)-phosphinic acid (132)

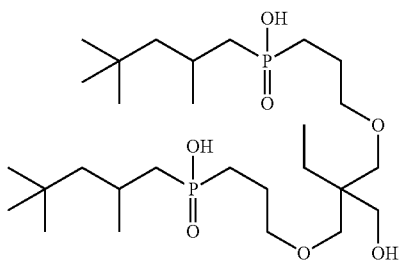
(132)

10 g (0.056 moles) of 2,4,4-trimethylpentyl phosphinic acid, 6.01 g (0.028 moles) of trimethylolpropane diallyl ether and 0.4 mL (0.0019 moles) of di-tert-amylperoxide are mixed in a 100 mL single neck flask. The mixture is purged with argon to remove oxygen and is heated under argon for 6 hours at 140° C. Tert-amyl alcohol is removed by distillation and 16 g (quantitative yield) of [3-(2-hydroxymethyl-2-{3-[hydroxy-(2,4,4-trimethylpentyl)-phosphinoyl]-propoxymethyl}-butoxy)-propyl]-(2,4,4-trimethylpentyl)-phosphinic acid is obtained as a viscous oil.

Example S33

(3-oxo-1,3-dihydro-isobenzofuran-1-yl)-(2,4,4-trimethylpentyl)-phosphinic acid (133)

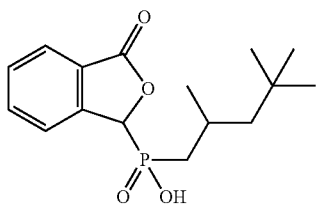
(133)

A mixture of 15 grams (0.1 moles) of 2-carboxybenzaldehyde and 17.82 grams of 2,4,4-trimethylpentyl phosphinic acid in 100 mL of xylene is heated to reflux and 1.8 mL of water is collected by azeotropic distillation using a Dean-Stark receiver. The xylene solvent is removed in vacuo and the residue is crystallized with a mixture of 50 mL of ethyl acetate and 100 mL heptane to yield 17.2 grams (56% yield) (3-oxo-1,3-dihydro-isobenzofuran-1-yl)-(2,4,4-trimethylpentyl)-phosphinic acid as an off-white powder, mp 117-121° C.

Compounds (134) and (135) are prepared in a similar manner to that of (133):

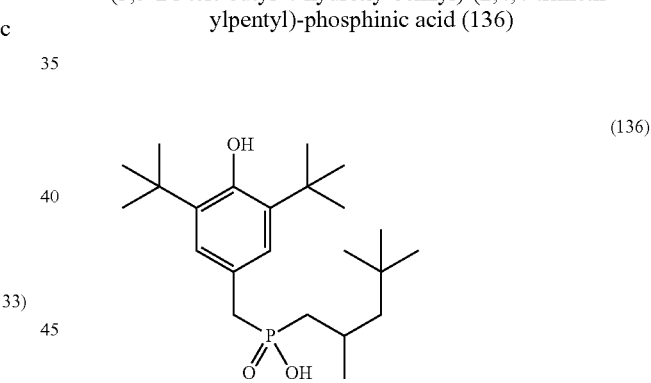

| Example | Structure/Compound | Form | Melting Point |
|---|---|---|---|
| S34 | (134) | off-white solid | 243° C. |
| S35 | (135) | off-white solid | 71-74° C. |

Example S36

(3,5-Di-tert-butyl-4-hydroxy-benzyl)-(2,4,4-trimethylpentyl)-phosphinic acid (136)

(136)

A solution of 1.78 grams (0.01 moles) of 2,4,4-trimethylpentyl phosphinic acid and 7.34 mL (0.03 moles) of N,O-bis(trimethylsilyl)acetamide in 5 mL of dichloromethane is heated at reflux for 4 hours then cooled to ambient temperature. To the resultant reaction mixture is added 2.55 grams (0.01 moles) 3,5-di-tert-butyl-4-hydroxybenzyl chloride (CAS REG #955-01-1) and the reaction mixture is reheated to reflux for an additional 3 hours. The reaction mixture is concentrated in vacuo and the resultant residue is treated with 15 mL of methanol and 4 mL of concentrated hydrochloric acid to hydrolyze the intermediate silyl esters. The crude product is isolated by evaporating the methanol, dissolving in dichloromethane and washing the dichloromethane solution with 2 portions of water then drying over sodium sulfate. Evaporation of solvent gives 3.94 grams (99% yield) of an amber oil. The crude material is recrystallized from 10 mL of acetonitrile to give 1.1 grams of (3,5-di-tert-butyl-4-hydroxy-benzyl)-(2,4,4-trimethylpentyl)-phosphinic acid as a white solid; mp 108-110° C.

APPLICATION EXAMPLES

Analytical Procedure:

Intrinsic Viscosity (I.V.): 1 g of polymer is dissolved in 100 g of a 3:2 mixture of phenol and tetrachloroethane. The viscosity of this solution is measured at 35° C. using a Viscotek relative viscometer Y501C and recalculated to the intrinsic viscosity.

General Polyester (PET) Synthesis Procedure

General polymerization procedure for 4 L polycondensation batch reactor. A batch reactor is used which is equipped with a pressurized, heated autoclave reactor with impeller stirrer, inert gas inlet system, a fractionating column to separate water of reaction and ethylene glycol during esterification phase removing water from the reaction and returning ethylene glycol to the reaction mass; a sidearm transfer line connected to collection vessel and vacuum system capable of collecting reaction co-products ethylene glycol and water during vacuum polycondensation; a discharge valve system at the bottom of the reactor for discharge and isolation of polymer product. Various process points are instrumented with thermocouples and pressure transducers to monitor or control the reaction system.

Materials

PTA, purified terephthalic acid (8.933 mols, 1484 grams)
PIA, purified isophthalic acid (0.276 mols, 46 grams)
EG, ethylene glycol (11.11 mols, 689 grams)
(optionally) a suppressant to reduce diethylene glycol formation (e.g.) choline hydroxide as a 45% methanolic solution
Antimony trioxide 240 ppm
Other additives, as desired The EG (120 mol %) is added and stirring begun. The DEG (diethylene glycol) suppressant may be added via pipette and washed in with EG. Optionally any liquid additives can be added at this point via pipette. A mixture of 97 mol % PTA with 3% PIA and antimony trioxide catalyst is charged to the reactor. Optionally any solid additives may be added at this point along with the PTA and PIA. Reactor is purged with nitrogen then closed.

For the esterification phase, the reaction mass is conditioned for 20 minutes at a temperature range 93-105° C., stirring at 20 rpm. Heaters are set at 275° C. & sidearm is set to 150° C. Stirring is raised incrementally over 30 minutes, up to 60 rpm when melt temperature reads 200° C. The esterification step is conducted at nominally 50 psig nitrogen pressure and reaches an ultimate temperature of 270° C. The time of esterification begins when water is observed in sight glass of collector (that is, water distills out of fractionating column begins). When the reactor melt temperature reaches nominally 260° C., the heater setpoints are adjusted downward to a final setpoint of about 243° C. which allows a final esterification temperature of about 270° C.

It takes about 1 hour 45 minutes from beginning of the batch (time zero) until the beginning of water distillation from the fractionating column into the water collector. It takes an additional 120 minutes to complete esterification (i.e. when top of column temperature has dropped & stabilized at 125-135° C.).

The next phase of the process sometimes referred to as Atmospheric Esterification (alias pre-polycondensation) occurs when the reactor pressure is released and brought to atmospheric pressure. Atmospheric esterification is conducted for 30 minutes at 270° C. Optionally, additives may be added to the reactor at this point using a septum on the addition port and a large gauge syringe. Addition of additives at this point in the process is considered to be prior to the start of the second step.

The next phase of the process, vacuum polycondensation, occurs when the reactor pressure (i.e. applying a vacuum) is reduced over 60 minutes down to 1 torr or less via programmed vacuum reduction step-down program. Upon reaching final vacuum level, polycondensation continues for about 60 minutes at a final melt temperature target of 285-286° C. Over this total polycondensation time, the reactor stirring speed is reduced in increments as the polymer molecular weight (i.e. melt viscosity) increases. Typically the reactor is held at 60 rpm for 105 minutes, then at 50 rpm for 15 minutes, at 40 rpm for 10 minutes, and at 15 rpm for 15 minutes until polymer discharge. The total time of polycondensation may differ slightly since the reaction endpoint is generally determined by a motor torque value & not by reaction time. Polycondensations of significantly faster reaction rate will reach the endpoint torque value sooner than a standard polyester formulation, such as the case with improved catalysts or coadditives in the formulation. Upon reaching a given motor torque level the polymerization reaction is considered completed. Additives optionally may be added to the reactor at this point using a septum on the addition port and a large gauge syringe. Addition of additives at this point in the process is considered to be towards the end of the second step and prior to the solid state polymerization step. At this time the batch is discharged from the bottom of the reactor, stranded through a water trough and converted to chip. The esterification time is 105 minutes and polycondensation time is 60 minutes. A polyester is produced with dilute solution viscosity value 0.63 dL/g.

General Solid State Polymerization (SSP) Procedure

The polycondensation in the melt as described in the general polyester (PET) procedure above is followed by a solid state polymerization (SSP) to further increase the molecular weight as measured by monitoring the dilute solution intrinsic viscosity (I.V.).

The following description illustrates the general procedure:

1200 grams of polyethylene terephthalate pellets prepared according to general polyester (PET) procedure, using 240 ppm of antimony trioxide catalyst, are placed in a drying oven for 16 hours at 110° C. under a vacuum of 50 torr to dry the pellets. The dried pellets are transferred into a vacuum tumbling dryer. During continuous tumbling of the polyethylene terephthalate under a vacuum of 1 to 2 torr, the temperature is raised to 214° C. over a 2 hour period. After 10 hours at 214° C., the polyethylene terephthalate pellets are cooled. A polyester is produced with dilute solution intrinsic viscosity value (I.V.) 0.68 dL/g.

Example A1

A polyester is produced as per the general polyester (PET) synthesis procedure. In addition, 757 ppm of compound (104) are added to the reactor at the start of the process (start step 1). The remainder of the polymerization process is conducted as described above. A polyester is produced with dilute solution viscosity value (I.V.) 0.62 dL/g.

Example A2

A polyester is produced by the procedure of Example A1 and 1200 grams of the polyethylene terephthalate pellets are further reacted according to the general solid state polymerization (SSP) procedure at 216° C. over a 10 hour period. A polyester is produced with dilute solution intrinsic viscosity value (I.V.) 0.83 dL/g.

Example A3

A polyester is produced per the general polyester (PET) synthesis procedure with the exception that 300 ppm of a titanium catalyst (2% by weight titanium) is used instead of 240 ppm of antimony trioxide is added during the addition of the ethylene glycol. In addition, 250 ppm of compound (104) are added to the reactor at the start of the process (start step 1). The remainder of the polymerization process is conducted as described above. The esterification time is 96 minutes and polycondensation time is 69 minutes. A polyester is produced with dilute solution viscosity value 0.62 dL/g.

Example A4

A polyester is produced by the procedure of Example A3 and 1200 grams of the polyethylene terephthalate pellets are further reacted according to the general solid state polymerization (SSP) procedure at 205° C. over a 10 hour period. A polyester is produced with dilute solution intrinsic viscosity value (I.V.) 0.66 dL/g.

Example A5

A polyester is produced as per the general polyester (PET) synthesis procedure. In addition, 250 ppm of compound (101) are added to the reactor at the start of the process (start step 1). The remainder of the polymerization process is conducted as described above. A polyester is produced with dilute solution viscosity value (I.V.) 0.62

Example A6

A polyester is produced by the procedure of Example A5 and 1200 grams of the polyethylene terephthalate pellets are further reacted according to the general solid state polymerization (SSP) procedure at 214° C. over a 10 hour period. A polyester is produced with dilute solution intrinsic viscosity value (I.V.) 0.71 dL/g.

Examples A7-20

Polyesters are produced as per the general polyester (PET) synthesis procedure and 1200 grams of the polyethylene terephthalate pellets are further reacted according to the general solid state polymerization (SSP) procedure at the specified temperature over a 10 hour period. In the table below are listed the SSP temperature, initial IV (before SSP), final IV (after 10 hours) and the SSP rate (dL/g/hr). The phosphinic acid compounds are added at the beginning (start step 1).

| Example/ Additive compound | Conc. (ppm) | Temp (° C.) | Initial IV | Final IV | Rate |
|---|---|---|---|---|---|
| A7 none | 0 | 214 | 0.63 | 0.68 | 0.005 |
| A8 (111) | 500 | 210 | 0.60 | 0.67 | 0.007 |
| A9 (113) | 500 | 210 | 0.62 | 0.72 | 0.010 |
| A10 (115) | 1000 | 217 | 0.60 | 0.91 | 0.031 |
| A11 (117) | 500 | 210 | 0.63 | 0.73 | 0.010 |
| A12 (123) | 1000 | 216 | 0.63 | 0.74 | 0.011 |
| A13 (121) | 1000 | 216 | 0.64 | 0.84 | 0.020 |
| A14 (124) | 1000 | 218 | 0.62 | 1.00 | 0.038 |
| A15 (126) | 1000 | 216 | 0.63 | 0.75 | 0.012 |
| A16 (122) | 1000 | 216 | 0.62 | 0.71 | 0.009 |
| A17 (123) | 1000 | 216 | 0.63 | 0.70 | 0.007 |
| A18 (128) | 1000 | 215 | 0.61 | 0.76 | 0.015 |
| A19 (129) | 1000 | 217 | 0.63 | 0.90 | 0.027 |
| A20 (131) | 500 | 215 | 0.62 | 0.75 | 0.013 |

What is claimed is:

1. A phosphinic acid compound of formula I, II or III

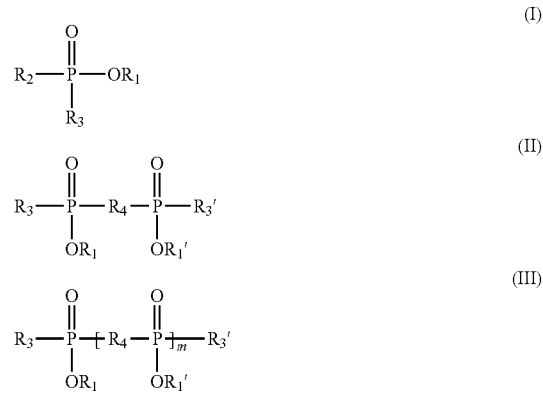

where
in compounds of formula I
$R_1$ is
hydrogen;
$C_6$-$C_{12}$aryl;
straight or branched chain $C_1$-$C_{50}$alkyl;
straight or branched chain $C_2$-$C_{50}$alkyl interrupted by one to three —O—, —NR—, —COO—, —OCO—, —CONR— or $C_6$-$C_{12}$arylene groups;
straight or branched chain $C_1$-$C_{50}$alkyl substituted by one to three —OR, —NRR', —COOR, —CONRR' or $C_6$-$C_{12}$aryl groups;
straight or branched chain $C_2$-$C_{50}$alkyl both interrupted and substituted by one to six of said groups;
where each of the aryl or arylene groups are unsubstituted or are substituted by one to three straight or branched chain $C_1$-$C_{12}$alkyl or —OR groups;
—(CH$_2$CH$_2$O)$_n$—CH$_2$CH$_2$OH where n is from 1 to 100;
or $R_1$ and $R_1$' are an alkali or alkali earth metal;
$R_2$ is
$C_5$-$C_{18}$cycloalkyl;
straight or branched chain $C_{22}$-$C_{50}$alkyl;
straight or branched chain $C_{22}$-$C_{50}$alkyl substituted by $C_6$-$C_{12}$aryl;
straight or branched chain $C_2$-$C_{50}$alkyl interrupted by one to three —O—, —NR—, —COO—, —OCO—, —CONR—, $C_6$-$C_{12}$arylene, $C_5$-$C_{18}$cycloalkylene or $C_5$-$C_{18}$cycloalkenylene groups;
straight or branched chain $C_1$-$C_{50}$alkyl substituted by one to three —OR, —NRR', —COOR or —CONRR' groups; where the straight or branched chain $C_1$-$C_{50}$alkyl is selected from n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 2,4,4-trimethylpentyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, icosyl and docosyl;
straight or branched chain $C_2$-$C_{50}$alkyl both interrupted and substituted by one to six of —O—, —NR—, —COO—, —OCO—, —CONR—, $C_6$-$C_{12}$arylene, $C_5$-$C_{18}$cycloalkylene or $C_5$-$C_{18}$cycloalkenylene and —OR, —NRR', —COOR or —CONRR' groups;

straight or branched chain $C_1$-$C_{50}$alkyl substituted by 3,5-di-tert-butyl-4-hydroxyphenyl;

3,5-di-tert-butyl-4-hydroxyphenyl;

—$(CH_2CH_2O)_n$—$CH_2CH_2OH$ where n is from 1 to 100; or 3-oxo-1,3-dihydroisobenzofuran-1-yl which is unsubstituted or is substituted by one to three straight or branched chain $C_1$-$C_{12}$alkyl, —OR or —COOR groups;

$R_3$ is hydrogen;

$C_5$-$C_{18}$cycloalkyl;

$C_6$-$C_{12}$aryl;

straight or branched chain $C_1$-$C_{50}$alkyl;

straight or branched chain $C_2$-$C_{50}$alkyl interrupted by one to three —O—, —NR—, —COO—, —OCO—, —CONR—, $C_6$-$C_{12}$arylene, $C_5$-$C_{18}$cycloalkylene or $C_5$-$C_{18}$cycloalkenylene groups;

straight or branched chain $C_1$-$C_{50}$alkyl substituted by one to three —OR, —NRR', —COOR, —CONRR' or $C_6$-$C_{12}$aryl groups;

straight or branched chain $C_2$-$C_{50}$alkyl both interrupted and substituted by one to six of said groups;

where each of the aryl or arylene groups are unsubstituted or are substituted by one to three straight or branched chain $C_1$-$C_{12}$alkyl or —OR groups;

—$(CH_2CH_2O)_n$—$CH_2CH_2OH$ where n is from 1 to 100; or 3-oxo-1,3-dihydroisobenzofuran-1-yl which is unsubstituted or is substituted by one to three straight or branched chain $C_1$-$C_{12}$alkyl, —OR or —COOR groups;

or $R_1$ and $R_2$ together or $R_2$ and $R_3$ together are (—$CH_2$—)$_n$ where n is an integer of from 3 to 7, or together are (—$CH_2$—)$_n$ which is annulated with 1 or 2 phenylene groups; and R and R' are independently hydrogen or straight or branched chain $C_1$-$C_{12}$alkyl; and where in compounds of formulae II and III $R_1$ and $R_1'$ are independently hydrogen;

$C_6$-$C_{12}$aryl;

straight or branched chain $C_1$-$C_{50}$alkyl;

straight or branched chain $C_2$-$C_{50}$alkyl interrupted by one to three —O—, —NR—, —COO—, —OCO—, —CONR— or $C_6$-$C_{12}$arylene groups;

straight or branched chain $C_1$-$C_{50}$alkyl substituted by one to three —OR, —NRR', —COOR, —CONRR' or $C_6$-$C_{12}$aryl groups;

straight or branched chain $C_2$-$C_{50}$alkyl both interrupted and substituted by one to six of said groups;

where each of the aryl or arylene groups are unsubstituted or are substituted by one to three straight or branched chain $C_1$-$C_{12}$alkyl or —OR groups;

—$(CH_2CH_2O)_n$—$CH_2CH_2OH$ where n is from 1 to 100;

or $R_1$ and $R_1'$ are an alkali or alkali earth metal;

$R_3$ and $R_3'$ are independently hydrogen;

$C_5$-$C_{18}$cycloalkyl;

$C_6$-$C_{12}$aryl;

straight or branched chain $C_1$-$C_{50}$alkyl;

straight or branched chain $C_2$-$C_{50}$alkyl interrupted by one to three —O—, —NR—, —COO—, —OCO—, —CONR—, $C_6$-$C_{12}$arylene, $C_5$-$C_{18}$cycloalkylene or $C_5$-$C_{18}$cycloalkenylene groups;

straight or branched chain $C_1$-$C_{50}$alkyl substituted by one to three —OR, —NRR', —COOR, —CONRR' or $C_6$-$C_{12}$aryl groups;

straight or branched chain $C_2$-$C_{50}$alkyl both interrupted and substituted by one to six of said groups;

where each of the aryl or arylene groups are unsubstituted or are substituted by one to three straight or branched chain $C_1$-$C_{12}$alkyl or —OR groups;

—$(CH_2CH_2O)_n$—$CH_2CH_2OH$ where n is from 1 to 100; or 3-oxo-1,3-dihydroisobenzofuran-1-yl which is unsubstituted or is substituted by one to three straight or branched chain $C_1$-$C_{12}$alkyl, —OR or —COOR groups;

or, $R_1$ and $R_3$ together or $R_1'$ and $R_3'$ together or $R_1$ and $R_3$ together and $R_1'$ and $R_3'$ together are (—$CH_2$—)$_n$ where n is an integer of from 3 to 7, or together are (—$CH_2$—)$_n$ which is annulated with 1 or 2 phenylene groups;

R and R' are independently hydrogen or straight or branched chain $C_1$-$C_{12}$alkyl;

$R_4$ is straight or branched chain $C_1$-$C_{50}$alkylene;

straight or branched chain $C_1$-$C_{50}$alkylene substituted by one to three —OR, —NRR', —COOR, —CONRR' or $C_6$-$C_{12}$aryl groups;

straight or branched chain $C_2$-$C_{50}$alkylene interrupted by one to three —O—, —NR—, —COO—, —OCO—, —CONR—, $C_6$-$C_{12}$arylene or $C_5$-$C_{18}$cycloalkylene groups;

straight or branched chain $C_2$-$C_{50}$alkyene both interrupted and substituted by one to six of said groups;

$C_5$-$C_{18}$cycloalkylene which is unsubstituted or is substituted by one to three $C_1$-$C_6$alkyl, —OR, —NRR', —COOR, —CONRR' or $C_6$-$C_{12}$aryl groups;

$C_5$-$C_{18}$cycloalkylene which is interrupted by one to three —O—, —NR—, —COO—, —OCO—, —CONR— or $C_6$-$C_{12}$arylene groups;

$C_5$-$C_{18}$cycloalkylene which is both interrupted and substituted by one to six of said groups;

$C_6$-$C_{50}$alkylenecycloalkylene; or $C_6$-$C_{12}$arylene;

where each of the aryl or arylene groups are unsubstituted or are substituted by one to three straight or branched chain $C_1$-$C_{12}$alkyl or —OR groups;

and m is from 2 to 100 and where the compounds

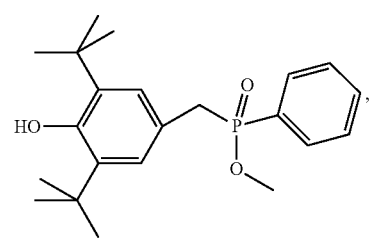

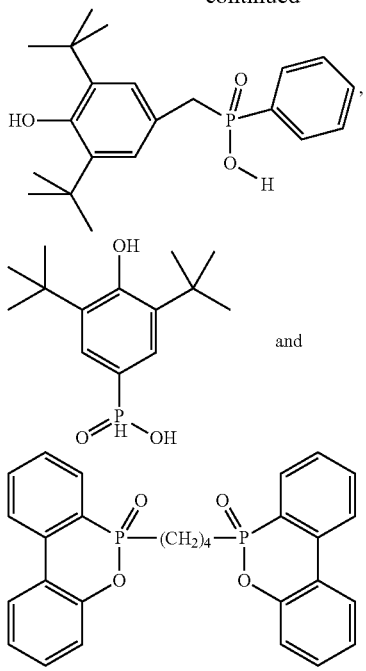

are excluded.

2. A compound according to claim 1 of formula I.

3. A compound according to claim 1 of formula I where $R_2$ is straight or branched chain $C_{22}$-$C_{50}$alkyl;

straight or branched chain $C_{22}$-$C_{50}$alkyl substituted by $C_6$-$C_{12}$aryl;

straight or branched chain $C_2$-$C_{50}$alkyl interrupted by one to three —O—, —NR—, —COO—, —OCO—, —CONR—, $C_6$-$C_{12}$arylene, $C_5$-$C_{18}$cycloalkylene or $C_5$-$C_{18}$cycloalkenylene groups;

straight or branched chain $C_1$-$C_{50}$alkyl substituted by one to three —OR, —NRR', —COOR or —CONRR' groups; where the straight or branched chain $C_1$-$C_{50}$alkyl is selected from n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 2,4,4-trimethylpentyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, icosyl and docosyl; or straight or branched chain $C_2$-$C_{50}$alkyl both interrupted and substituted by one to six of —O—, —NR—, —COO—, —OCO—, —CONR—, $C_6$-$C_{12}$arylene, $C_5$-$C_{18}$cycloalkylene or $C_5$-$C_{18}$cycloalkenylene and —OR, —NRR', —COOR or —CONRR' groups.

4. A compound according to claim 1 of formula I where $R_2$ is straight or branched chain $C_1$-$C_{50}$alkyl substituted by 3,5-di-tert-butyl-4-hydroxyphenyl;

3,5-di-tert-butyl-4-hydroxyphenyl;

or $R_2$ is 3-oxo-1,3-dihydroisobenzofuran-1-yl which is unsubstituted or is substituted by one to three straight or branched chain $C_1$-$C_{12}$alkyl, —OR or —COOR groups.

5. A compound according to claim 1 of formula II or III.

6. A compound according to claim 1 of formula II or III where $R_3$ and $R_3'$ are $C_6$-$C_{12}$aryl;

straight or branched chain $C_1$-$C_{50}$alkyl;

straight or branched chain $C_2$-$C_{50}$alkyl interrupted by one to three —O—, —NR—, —COO—, —OCO—, —CONR—, $C_6$-$C_{12}$arylene, $C_5$-$C_{18}$cycloalkylene or $C_5$-$C_{18}$cycloalkenylene groups;

straight or branched chain $C_1$-$C_{50}$alkyl substituted by one to three —OR, —NRR', —COOR, —CONRR' or $C_6$-$C_{12}$aryl groups;

straight or branched chain $C_2$-$C_{50}$alkyl both interrupted and substituted by one to six of said groups;

where each of the aryl or arylene groups are unsubstituted or are substituted by one to three straight or branched chain $C_1$-$C_{12}$alkyl or —OR groups;

or $R_3$ and $R_3'$ are 3-oxo-1,3-dihydroisobenzofuran-1-yl which is unsubstituted or is substituted by one to three straight or branched chain $C_1$-$C_{12}$alkyl, —OR or —COOR groups.

7. A composition comprising a polyester and a phosphinic acid compound of formula I, II or III

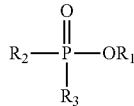 (I)

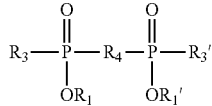 (II)

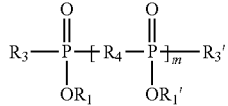 (III)

where in compounds of formula I $R_1$ is hydrogen;

$C_6$-$C_{12}$aryl;

straight or branched chain $C_1$-$C_{50}$alkyl;

straight or branched chain $C_2$-$C_{50}$alkyl interrupted by one to three —O—, —NR—, —COO—, —OCO—, —CONR— or $C_6$-$C_{12}$arylene groups;

straight or branched chain $C_1$-$C_{50}$alkyl substituted by one to three —OR, —NRR', —COOR, —CONRR' or $C_6$-$C_{12}$aryl groups;

straight or branched chain $C_2$-$C_{50}$alkyl both interrupted and substituted by one to six of said groups;

where each of the aryl or arylene groups are unsubstituted or are substituted by one to three straight or branched chain $C_1$-$C_{12}$alkyl or —OR groups;

—(CH$_2$CH$_2$O)$_n$—CH$_2$CH$_2$OH where n is from 1 to 100;

or $R_1$ and $R_1'$ are an alkali or alkali earth metal;

$R_2$ is $C_5$-$C_{18}$cycloalkyl;

straight or branched chain $C_{22}$-$C_{50}$alkyl;

straight or branched chain $C_{22}$-$C_{50}$alkyl substituted by $C_6$-$C_{12}$aryl;

straight or branched chain $C_2$-$C_{50}$alkyl interrupted by one to three —O—, —NR—, —COO—, —OCO—, —CONR—, $C_6$-$C_{12}$arylene, $C_5$-$C_{18}$cycloalkylene or $C_5$-$C_{18}$cycloalkenylene groups;

straight or branched chain $C_1$-$C_{50}$alkyl substituted by one to three —OR, —NRR', —COOR or —CONRR' groups; where the straight or branched chain $C_1$-$C_{50}$alkyl is selected from n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 2,4,4-trimethylpentyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, icosyl and docosyl;

straight or branched chain $C_2$-$C_{50}$alkyl both interrupted and substituted by one to six of —O—, —NR—, —COO—, —OCO—, —CONR—, $C_6$-$C_{12}$arylene, $C_5$-$C_{18}$cycloalkylene or $C_5$-$C_{18}$cycloalkenylene and —OR, —NRR', —COOR or —CONRR' groups;

straight or branched chain $C_1$-$C_{50}$alkyl substituted by 3,5-di-tert-butyl-4-hydroxyphenyl;

3,5-di-tert-butyl-4-hydroxyphenyl;

—(CH$_2$CH$_2$O)$_n$—CH$_2$CH$_2$OH where n is from 1 to 100; or 3-oxo-1,3-dihydroisobenzofuran-1-yl which is unsubstituted or is substituted by one to three straight or branched chain $C_1$-$C_{12}$alkyl, —OR or —COOR groups;

$R_3$ is hydrogen;

$C_5$-$C_{18}$cycloalkyl;

$C_6$-$C_{12}$aryl;

straight or branched chain $C_1$-$C_{50}$alkyl;

straight or branched chain $C_2$-$C_{50}$alkyl interrupted by one to three —O—, —NR—, —COO—, —OCO—, —CONR—, $C_6$-$C_{12}$arylene, $C_5$-$C_{18}$cycloalkylene or $C_5$-$C_{18}$cycloalkenylene groups;

straight or branched chain $C_1$-$C_{50}$alkyl substituted by one to three —OR, —NRR', —COOR, —CONRR' or $C_6$-$C_{12}$aryl groups;

straight or branched chain $C_2$-$C_{50}$alkyl both interrupted and substituted by one to six of said groups;

where each of the aryl or arylene groups are unsubstituted or are substituted by one to three straight or branched chain $C_1$-$C_{12}$alkyl or —OR groups;

—(CH$_2$CH$_2$O)$_n$—CH$_2$CH$_2$OH where n is from 1 to 100; or 3-oxo-1,3-dihydroisobenzofuran-1-yl which is unsubstituted or is substituted by one to three straight or branched chain $C_1$-$C_{12}$alkyl, —OR or —COOR groups;

or $R_1$ and $R_2$ together or $R_2$ and $R_3$ together are (—CH$_2$—)$_n$ where n is an integer of from 3 to 7, or together are (—CH$_2$—)$_n$ which is annulated with 1 or 2 phenylene groups; and R and R' are independently hydrogen or straight or branched chain $C_1$-$C_{12}$alkyl; and where in compounds of formulae II and III $R_1$ and $R_1$' are independently hydrogen;

$C_6$-$C_{12}$aryl;

straight or branched chain $C_1$-$C_{50}$alkyl;

straight or branched chain $C_2$-$C_{50}$alkyl interrupted by one to three —O—, —NR—, —COO—, —OCO—, —CONR— or $C_6$-$C_{12}$arylene groups;

straight or branched chain $C_1$-$C_{50}$alkyl substituted by one to three —OR, —NRR', —COOR, —CONRR' or $C_6$-$C_{12}$aryl groups;

straight or branched chain $C_2$-$C_{50}$alkyl both interrupted and substituted by one to six of said groups;

where each of the aryl or arylene groups are unsubstituted or are substituted by one to three straight or branched chain $C_1$-$C_{12}$alkyl or —OR groups;

—(CH$_2$CH$_2$O)$_n$—CH$_2$CH$_2$OH where n is from 1 to 100;

or $R_1$ and $R_1$' are an alkali or alkali earth metal;

$R_3$ and $R_3$' are independently hydrogen;

$C_5$-$C_{18}$cycloalkyl;

$C_6$-$C_{12}$aryl;

straight or branched chain $C_1$-$C_{50}$alkyl;

straight or branched chain $C_2$-$C_{50}$alkyl interrupted by one to three —O—, —NR—, —COO—, —OCO—, —CONR—, $C_6$-$C_{12}$arylene, $C_5$-$C_{18}$cycloalkylene or $C_5$-$C_{18}$cycloalkenylene groups;

straight or branched chain $C_1$-$C_{50}$alkyl substituted by one to three —OR, —NRR', —COOR, —CONRR' or $C_6$-$C_{12}$aryl groups;

straight or branched chain $C_2$-$C_{50}$alkyl both interrupted and substituted by one to six of said groups;

where each of the aryl or arylene groups are unsubstituted or are substituted by one to three straight or branched chain $C_1$-$C_{12}$alkyl or —OR groups;

—(CH$_2$CH$_2$O)$_n$—CH$_2$CH$_2$OH where n is from 1 to 100; or 3-oxo-1,3-dihydroisobenzofuran-1-yl which is unsubstituted or is substituted by one to three straight or branched chain $C_1$-$C_{12}$alkyl, —OR or —COOR groups;

or, $R_1$ and $R_3$ together or $R_1$' and $R_3$' together or $R_1$ and $R_3$ together and $R_1$' and $R_3$' together are (—CH$_2$—)$_n$ where n is an integer of from 3 to 7, or together are (—CH$_2$—)$_n$ which is annulated with 1 or 2 phenylene groups;

R and R' are independently hydrogen or straight or branched chain $C_1$-$C_{12}$alkyl;

$R_4$ is straight or branched chain $C_1$-$C_{50}$alkylene;

straight or branched chain $C_1$-$C_{50}$alkylene substituted by one to three —OR, —NRR', —COOR, —CONRR' or $C_6$-$C_{12}$aryl groups;

straight or branched chain $C_2$-$C_{50}$alkylene interrupted by one to three —O—, —NR—, —COO—, —OCO—, —CONR—, $C_6$-$C_{12}$arylene or $C_5$-$C_{18}$cycloalkylene groups;

straight or branched chain $C_2$-$C_{50}$alkyene both interrupted and substituted by one to six of said groups;

$C_5$-$C_{18}$cycloalkylene which is unsubstituted or is substituted by one to three $C_1$-$C_6$alkyl, —OR, —NRR', —COOR, —CONRR' or $C_6$-$C_{12}$aryl groups;

$C_5$-$C_{18}$cycloalkylene which is interrupted by one to three —O—, —NR—, —COO—, —OCO—, —CONR— or $C_6$-$C_{12}$arylene groups;

$C_5$-$C_{18}$cycloalkylene which is both interrupted and substituted by one to six of said groups;

$C_6$-$C_{50}$alkylenecycloalkylene; or $C_6$-$C_{12}$arylene;

where each of the aryl or arylene groups are unsubstituted or are substituted by one to three straight or branched chain $C_1$-$C_{12}$alkyl or —OR groups;
and m is from 2 to 100.

8. A composition according to claim 7 where the phosphinic acid compound is of formula I.

9. A composition according to claim 7 where the phosphinic acid compound is of formula I where $R_2$ is straight or branched chain $C_{22}$-$C_{50}$alkyl;

straight or branched chain $C_{22}$-$C_{50}$alkyl substituted by $C_6$-$C_{12}$aryl;

straight or branched chain $C_2$-$C_{50}$alkyl interrupted by one to three —O—, —NR—, —COO—, —OCO—, —CONR—, $C_6$-$C_{12}$arylene, $C_5$-$C_{18}$cycloalkylene or $C_5$-$C_{18}$cycloalkenylene groups;

straight or branched chain $C_1$-$C_{50}$alkyl substituted by one to three —OR, —NRR', —COOR or —CONRR' groups; where the straight or branched chain $C_1$-$C_{50}$alkyl is selected from n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 2,4,4-trimethylpentyl, 1,1,3,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, icosyl and docosyl; or straight or branched chain $C_2$-$C_{50}$alkyl both interrupted and substituted by one to six of —O—, —NR—, —COO—, —OCO—, —CONR—, $C_6$-$C_{12}$arylene, $C_5$-$C_{18}$cycloalkylene or $C_5$-$C_{18}$cycloalkenylene and —OR, —NRR', —COOR or —CONRR' groups.

10. A composition according to claim 7 where the phosphinic acid compound is of formula I where $R_2$ is straight or branched chain $C_1$-$C_{50}$alkyl substituted by 3,5-di-tert-butyl-4-hydroxyphenyl;

3,5-di-tert-butyl-4-hydroxyphenyl;

or $R_2$ is 3-oxo-1,3-dihydroisobenzofuran-1-yl which is unsubstituted or is substituted by one to three straight or branched chain $C_1$-$C_{12}$alkyl, —OR or —COOR groups.

11. A composition according to claim 7 where the phosphinic acid compound is of formula II or III.

12. A composition according to claim 7 where the phosphinic acid compound is of formula II or III where $R_3$ and $R_3'$ are $C_6$-$C_{12}$aryl;

straight or branched chain $C_1$-$C_{50}$alkyl;

straight or branched chain $C_2$-$C_{50}$alkyl interrupted by one to three —O—, —NR—, —COO—, —OCO—, —CONR—, $C_6$-$C_{12}$arylene, $C_5$-$C_{18}$cycloalkylene or $C_5$-$C_{18}$cycloalkenylene groups;

straight or branched chain $C_1$-$C_{50}$alkyl substituted by one to three —OR, —NRR', —COOR, —CONRR' or $C_6$-$C_{12}$aryl groups;

straight or branched chain $C_2$-$C_{50}$alkyl both interrupted and substituted by one to six of said groups;

where each of the aryl or arylene groups are unsubstituted or are substituted by one to three straight or branched chain $C_1$-$C_{12}$alkyl or —OR groups;

or $R_3$ and $R_3'$ are 3-oxo-1,3-dihydroisobenzofuran-1-yl which is unsubstituted or is substituted by one to three straight or branched chain $C_1$-$C_{12}$alkyl, —OR or —COOR groups.

13. A composition according to claim 7 where the polyester is poly(ethylene terephthalate), poly(ethylene-2,6-naphthalene-dicarboxylate) or poly(1,4-butylene terephthalate).

* * * * *